(12) United States Patent
Okabe et al.

(10) Patent No.: US 7,777,847 B2
(45) Date of Patent: *Aug. 17, 2010

(54) LIQUID CRYSTAL DISPLAY AND MANUFACTURING METHOD OF THE SAME

(75) Inventors: Masato Okabe, Tokyo (JP); Naoko Sawatari, Tokyo (JP); Makoto Ishikawa, Tokyo (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 1153 days.

This patent is subject to a terminal disclaimer.

(21) Appl. No.: 11/148,896

(22) Filed: Jun. 9, 2005

(65) Prior Publication Data

US 2006/0082719 A1    Apr. 20, 2006

(30) Foreign Application Priority Data

Jun. 11, 2004    (JP) .............................. 2004-174673

(51) Int. Cl.
*G02F 1/1337* (2006.01)
*C09K 19/02* (2006.01)

(52) U.S. Cl. ...................................... 349/123; 349/172
(58) Field of Classification Search .......... 349/123–136
See application file for complete search history.

(56) References Cited

U.S. PATENT DOCUMENTS 5,085,498 A * 2/1992 Yamamoto et al. .......... 349/123
5,818,557 A * 10/1998 Konuma et al. ............... 349/93
6,411,354 B1 * 6/2002 Lavrentovich et al. ........ 349/84
2005/0068476 A1 * 3/2005 Okabe ......................... 349/96
2006/0038949 A1 * 2/2006 Okabe et al. ................. 349/133

OTHER PUBLICATIONS

Nonaka, T., Li, J., Ogawa, A., Hornung, B., Schmidt, W., Wingen, R., and Dubal, H., Liquid Crystals, 1999, vol. 26, No. 11, 1599-1602, Material charcateristics of an active matrix LCD based upon chiral smectics.
Patel, J., and Goodby, J.W., 1986, J. Appl. Phys., 59, (7), 2355-2360, Alignment of liquid crystals which exhibit cholesteric to smectic C* phase transitions.
USPTO Office Action mailed Apr. 8, 2008 for U.S. Appl. No. 11/148,826 (Patent No. 7,499,135).
USPTO Office Action mailed Aug. 4, 2008 for U.S. Appl. No. 11/148,494 (Patent No. 7,570,331).
USPTO Office Action mailed Apr. 4, 2008 for U.S. Appl. No. 11/148,494 (Patent No. 7,570,331).

* cited by examiner

*Primary Examiner*—Dung T. Nguyen
(74) *Attorney, Agent, or Firm*—Ladas & Parry LLP

(57) ABSTRACT

A liquid crystal display including two alignment substrates, each having, in this order, a substrate, an electrode layer and an alignment layer, with a ferroelectric liquid crystal interposed therebetween. At least one of the two alignment layers is a columnar alignment layer having a column structure with plate-like molecules laminated with the normal directions of the plate-like molecules aligned in a certain direction of the substrate.

12 Claims, 4 Drawing Sheets

LIQUID CRYSTAL DISPLAY AND MANUFACTURING METHOD OF THE SAME

BACKGROUND OF THE INVENTION

1. Field of the Invention

The present invention relates to liquid crystal display using ferroelectric liquid crystal and a manufacturing method of the same.

2. Description of the Related Art

Since liquid crystal display has features that it is thin and is low in power consumption and other features, the use has been expanding in various articles from large-sized displays to portable information terminals and the development has been actively made. Conventionally, for liquid crystal display, a TN system, an STN multiplex driving system, an active matrix driving system in which thin film transistors (hereinafter, it may be referred to as "TFT element") are used in TN, and others have been developed and made practicable. However, nematic liquid crystal is used therein; therefore, the response speed of the liquid crystal material is as small as several milliseconds to several tens of milliseconds and it cannot be said that these sufficiently cope with display of moving images.

On the other hand, ferroelectric liquid crystal exhibits a very short response time in order of microseconds, thus ferroelectric liquid crystal is suitable for high-speed devices. As such ferroelectric liquid crystal, there is well known a bistable liquid crystal suggested by Clark and Lagerwall and which has two stable states when no voltage is applied thereto. However, the liquid crystal has a problem that the liquid crystal has memory property but graduation display cannot be attained since the switching thereof is limited to two states, namely, bright and dark states.

In recent years, attention has been paid to ferroelectric liquid crystal, in which the liquid crystal layer thereof is stable in a single state (hereinafter referred to as "monostable") when no voltage is applied thereto, as a liquid crystal which makes it possible to attain graduation display by the matter that the director (the inclination of the molecule axis) of the liquid crystal is continuously changed by a change in applied voltage so as to analogue-modulate the light transmission thereof (NONAKA, T., LI, J., OGAWA, A., HORNUNG, B., SCHMIDT, W., WINGEN, R., and DUBAL, H., 1999, Liq. Cryst., 26, 1599).

As a method for having the mono-stability of the ferroelectric liquid crystal, there is a polymer stabilizing method for adding an ultraviolet curable monomer in the liquid crystal material, injecting into a cell, and curing so as to stabilize the alignment of the liquid crystal is known. Moreover, a method of obtaining the mono-stability of the ferroelectric liquid crystal by heating a ferroelectric liquid crystal not having the smectic A phase in the phase sequence so as to have the phase transition directly from the nematic phase to the chiral smectic C phase via the cholesteric phase in the temperature cooling process, to a temperature higher than the phase transition point of the cholesteric phase-nematic phase, and cooling down the same gradually, is known.

However, according to the polymer stabilizing method, problems are involved in that the process is complicated, the driving voltage is high, or the like. Moreover, according to the latter method not using the polymer stabilizing method, two different domains in the layer normal direction (hereinafter it may also be referred so as the "double domains") can easily be formed so as to give rise to the grave problem of the display with the black and white inverted at the time of the drive. As to the double domains, although a method for having the mono domain by the electric field induced technique (, which uses DC voltage during cooling process) of gradually cooling while applying the voltage, is known (PATEL, J., and GOODBY, J. W., 1986, J. Appl. Phys., 59, 2355.), there is a problem of the alignment disturbance in the case the ferroelectric liquid crystal again has a temperature higher than the phase transition point, and thus the practical usability is low.

Moreover, as a technique for align the liquid crystal, there also are the rubbing process, the photo alignment method, or the like. According to the rubbing process, which provides the alignment ability by rubbing the polyimide-coated surface, it is difficult to have the evenness at the time of processing a large area, and moreover, there are the problems of generating the static electricity, the dusts, or the like. On the other hand, according to the photo alignment method, which provides the alignment ability by arranging the molecules in a specific direction by irradiating a compound having the photo alignment property with an ultraviolet ray, or the like, it is advantageous in that the quantitative alignment process can be controlled without generation of the static electricity or the dusts, however, a problem is involved in that the device cost is required due to the need of the exposing process.

SUMMARY OF THE INVENTION

The present invention has been achieved in view of the problems. The main object is to provide a liquid crystal display using a ferroelectric liquid crystal that controls the alignment of the ferroelectric liquid crystal by a simple method without the need of an alignment process such as the rubbing process and the photo alignment process.

As a result of the elaborate discussion on the circumstances, the present inventors have found out that the alignment of the ferroelectric liquid crystal can be controlled by a simple method without the need of the alignment process such as the rubbing process and the photo alignment process by utilizing the self organization of plate-like molecule as the alignment layer for controlling the alignment of a ferroelectric liquid crystal so as to complete the present invention.

That is, the present invention provides a liquid crystal display comprising a first alignment substrate having a first substrate, a first electrode layer formed on the first substrate and a first alignment layer formed on the first electrode layer, and a second alignment substrate having a second substrate, a second electrode layer formed on the second substrate, and a second alignment layer formed on the second electrode layer, disposed such that the first alignment layer and the second alignment layer face with each other, with a ferroelectric liquid crystal interposed between the first alignment layer and the second alignment layer, wherein at least one of the first alignment layer and the second alignment layer is a columnar alignment layer having a column structure with the plate-like molecule laminated with the normal direction of the plate-like molecule aligned in a certain direction.

According to the liquid crystal display of the present invention, since at least one of the first alignment layer and the second alignment layer provided for controlling the alignment of the ferroelectric liquid crystal is a columnar alignment layer having a column structure comprising plate-like molecule laminated in a certain direction, the ferroelectric liquid crystal can be aligned by a simple method without the need of the rubbing process or the photo alignment process.

As the liquid crystal display of the present invention, it is preferable that the first alignment layer and the second alignment layer are the columnar alignment layer, wherein the normal direction of the plate-like molecule of the first alignment layer and the normal direction of the plate-like molecule of the second alignment layer are disposed substantially parallel, and the constituent materials of the first alignment layer and the second alignment layer have compositions different with each other. According to the present invention, since the first alignment layer and the second alignment layer are the columnar alignment layer, the ferroelectric liquid crystal can be aligned by a simple method. Furthermore, since the constituent materials of the first alignment layer and the second alignment layer have compositions different with each other, the alignment defects can hardly be generated so that the alignment stability of the ferroelectric liquid crystal can be excellent. Particularly in the case of using a ferroelectric liquid crystal showing the phase transition sequence without the smectic A phase (SmA), generation of the double domains can be restrained.

Moreover, as another embodiment of the liquid crystal display of the present invention, the first alignment layer and the second alignment layer are the columnar alignment layer, wherein the normal direction of the plate-like molecule of the first alignment layer and the normal direction of the plate-like molecule of the second alignment layer are disposed substantially perpendicularly, and a reactive liquid crystal layer produced by fixing a reactive liquid crystal including a polymerizable liquid crystal material and showing the nematic phase on the counter surface of the first alignment layer or the second alignment layer is provided. Accordingly, since the first alignment layer and the second alignment layer are the columnar alignment layer, disposed substantially perpendicularly, with the reactive liquid crystal layer provided on the counter surface of one of the alignment layers, the ferroelectric liquid crystal can be aligned by a simple method without generation of the alignment defects.

Furthermore, as another embodiment of the liquid crystal display of the present invention, the first alignment layer is the columnar alignment layer, and the second alignment layer is a photo alignment layer. Since one of the first alignment layer and the second alignment layer is the columnar alignment layer and the other alignment layer is a photo alignment layer, the ferroelectric liquid crystal can be aligned with the number of the alignment process steps reduced without generation of the alignment defects.

The constituent material for the photo alignment layer is preferably a photoreactive material for providing the anisotropy to the photo alignment layer by generating the photoreaction, or a photo isomerizable material for providing the anisotropy to the photo alignment layer by generating the photo isomerization reaction. By using the materials, the anisotropy can be provided easily to the photo alignment layer.

Moreover, according to the liquid crystal display of the present invention, the columnar alignment layer may comprise a resin layer with a concave part or a convex part having a predetermined width formed on the surface in a pattern, and the column structure formed along the concave part of the resin layer. Since the column structure is formed along the concave part of the resin layer, the column structure can be easily aligned in a certain direction.

Furthermore, it is preferable that the plate-like molecule constituting such columnar alignment layer shows a lyotropic liquid crystal phase in an aqueous solution. Since the plate-like molecule forms a column structure in the aqueous solution by the self organization so as to show the lyotropic liquid crystal phase, by coating a columnar alignment layer forming coating solution containing the plate-like molecule, the column structure can be aligned easily. Moreover, since the plate-like molecule is water soluble, the fixing process for fixing the column structure can be facilitated.

Further, according to the liquid crystal display of the invention, it is preferable that the ferroelectric liquid crystal shows the mono-stability driving characteristic. Since the ferroelectric liquid crystal shows the mono-stability driving characteristic, the graduation display can be enabled so that a highly precise liquid crystal display for the color display can be obtained.

Still further, it is preferable that the ferroelectric liquid crystal shows a phase transition sequence without the smectic A phase in the temperature cooling process. A ferroelectric liquid crystal showing such a phase transition sequence tends to show the mono-stability driving characteristic, and by using such a ferroelectric liquid crystal, a highly precise liquid crystal display for the color display can easily be obtained.

Moreover, it is preferable that the liquid crystal display of the invention comprises the thin film transistor (TFT element) in the first electrode layer or the second electrode layer of the active matrix drive. By adopting the active matrix system using TFT element, it becomes possible to switch on or off target pixels surely to give high-quality display. Furthermore, a liquid crystal display of the color display produced by combining a TFT substrate with the TFT elements disposed in a matrix on one of the substrates and a common electrode substrate with a common electrode formed on the display part entire region of the other substrate and forming a micro color filter disposed in a matrix of the TFT elements between the common electrode of the common electrode substrate and the substrate can be used as well.

Moreover, the liquid crystal display of the invention is preferably driven by a field sequential color system for the following reason: the liquid crystal display of the present invention has a large response speed and makes it possible to align the ferroelectric liquid crystal therein without forming any alignment defect; therefore, when the display element is driven by the field sequential color system, bright and highly precise display of color moving images which has a wide field angle can be realized at low costs and low power consumption.

Moreover, the present invention provides a manufacturing method of the liquid crystal display, comprising a coating film forming step of forming a coating film by coating a columnar alignment layer forming coating solution on the substrate, a drying step of drying the coating film, and a fixing process step of executing a hydrophobic process of the dried coating film so as to be fixed in the formation of the columnar alignment layer.

According to the manufacturing method of the present invention, a liquid crystal display capable of controlling the alignment of the ferroelectric liquid crystal can easily be manufactured only by coating a columnar alignment layer forming coating solution and carrying out a simple post process without the need of the alignment process. Moreover, since the fixing process step is provided, the column structure comprising the plate-like molecule can be fixed so that a liquid crystal display having the excellent alignment stability of the ferroelectric liquid crystal can be obtained.

According to the present invention, since the columnar alignment layer having a column structure with the plate-like molecule laminated with the plate-like molecule aligned in a certain direction of the substrate is used as the alignment layer for controlling the alignment of the ferroelectric liquid crystal, the ferroelectric liquid crystal can be aligned by a simple method without the need of the alignment process such as the rubbing process and the photo alignment process.

DESCRIPTION OF THE PREFERRED EMBODIMENT

The present invention provides a liquid crystal display, and a manufacturing method of the same. Hereinafter, the liquid crystal display of the present invention and the manufacturing method thereof will each be explained.

A. Liquid Crystal Display

Firstly, the liquid crystal display of the present invention will be explained. The liquid crystal display of the present invention is characterized in being a liquid crystal display comprising a first alignment substrate having a first substrate, a first electrode layer formed on the first substrate and a first alignment layer formed on the first electrode layer, and a second alignment substrate having a second substrate, a second electrode layer formed on the second substrate, and a second alignment layer formed on the second electrode layer, disposed such that the first alignment layer and the second alignment layer face with each other, with a ferroelectric liquid crystal interposed between the first alignment layer and the second alignment layer, wherein at least one of the first alignment layer and the second alignment layer is a columnar alignment layer having a column structure with the plate-like molecule laminated with the normal direction of the plate-like molecule aligned in a certain direction.

Figure 1A:
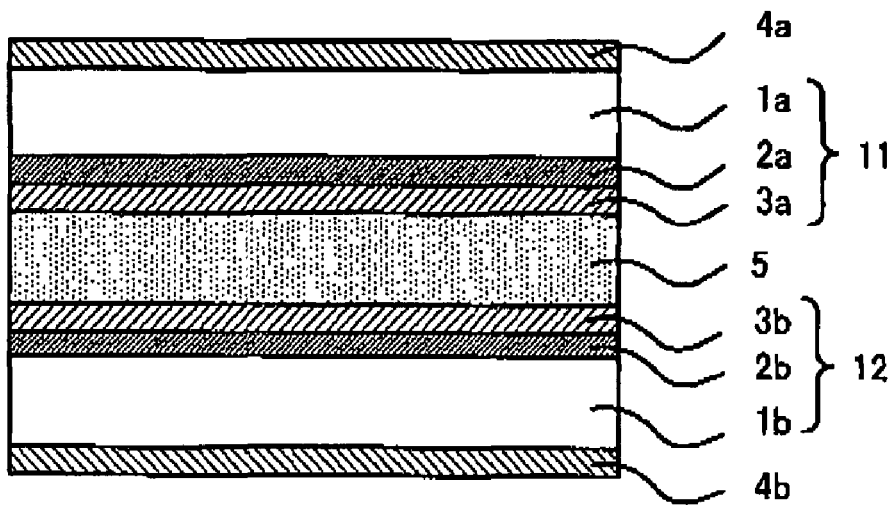
FIGS. 1A to 1B are schematic sectional views illustrating one example of the liquid crystal display of the present invention.
Figure 1B:
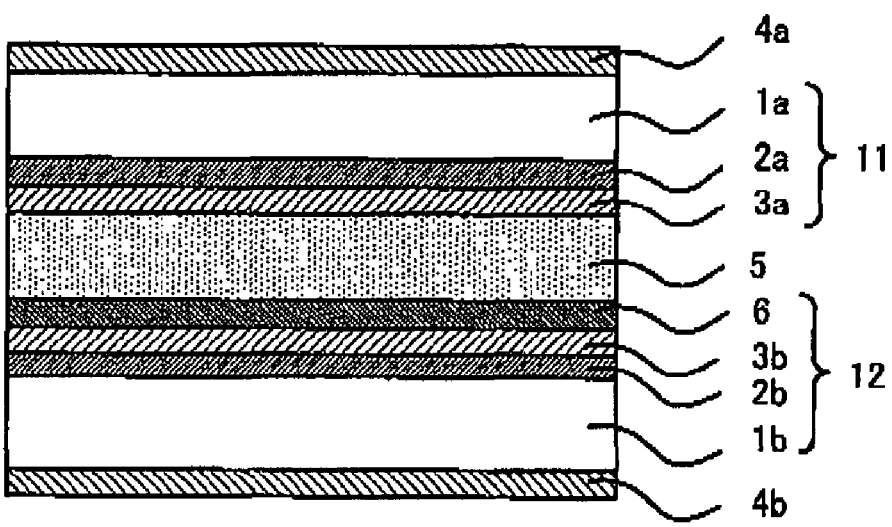

Such a liquid crystal display of the present invention will be explained with reference to the drawings. FIGS. 1A to 1B are schematic sectional views showing an example of the liquid crystal display of the present invention. In the liquid crystal display of the invention, as shown in FIG. 1A, a first alignment substrate 11 having a first substrate 1a, a first electrode layer 2a formed on the first substrate 1a and a first alignment layer 3a formed on the first electrode layer 2a, and a second alignment substrate 12 having a second substrate 1b, a second electrode layer 2b formed on the second substrate 1b and a second alignment layer 3b formed on the second electrode layer 2b are formed and the first alignment substrate 11 and the second alignment substrate 12 are disposed so as to have the first alignment layer 3b and the second alignment layer 3b face with each other. Moreover, a ferroelectric liquid crystal is interposed between the first alignment layer 3a and the second alignment layer 3b so as to provide a liquid crystal layer 5.

Figure 2A:
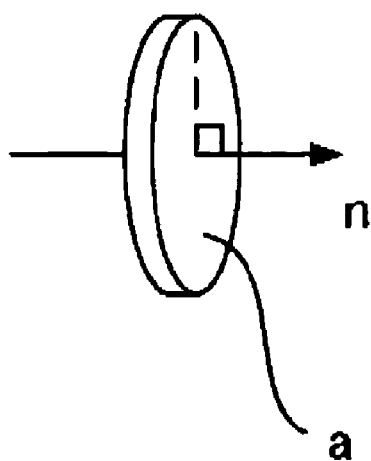
FIGS. 2A and 2B are diagrams for explaining the plate-like molecule and the column structure of the columnar alignment layer used in the present invention.
Figure 2B:
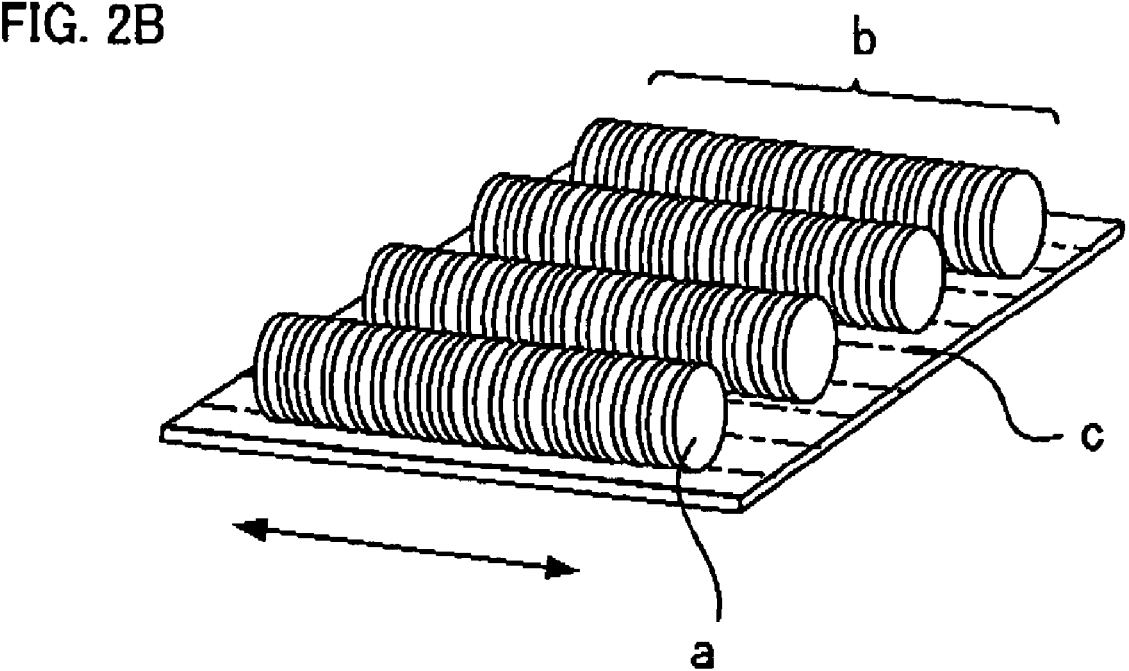

According to the liquid crystal display of the present invention, at least one of the first alignment layer and second alignment layer is a columnar alignment layer. FIG. 2A is a diagram showing the model structure and the normal direction of the plate-like molecule used in the present invention. FIG. 2B is a schematic perspective view of the columnar alignment layer used in the present invention. As shown in FIG. 2B, according to the columnar alignment layer, the plate-like molecule a forms a column structure b with the plate-like molecule a laminated along the concave parts of the resin layer c having concave parts or convex parts having a predetermined width formed in a pattern in the surface with the normal direction n of the plate-like molecule a aligned in a certain direction of the substrate so that a plurality of the column structures b are arranged so as to provide a columnar alignment layer. According to the present invention, since the columnar alignment layer comprises the plate-like molecule a accordingly arranged, the axial directions of the columns of the plurality of the column structures b of the columnar alignment layer are aligned in a certain direction of the substrate so that the alignment of the ferroelectric liquid crystal is controlled by the interaction of the column structure b and the ferroelectric liquid crystal.

Accordingly, since at least one of the first alignment layer and the second alignment layer of the liquid crystal display of the present invention is the columnar alignment layer, the ferroelectric liquid crystal can be aligned by a simple method without the need of the alignment process such as the rubbing process and the photo alignment process.

According to the liquid crystal display of the present invention, for the purpose of improving the alignment control ability or improving the bonding property, another layer may be provided between the layers. For example, as shown in FIG. 12, a reactive liquid crystal layer 6 produced by fixing a reactive liquid crystal which includes a polymerizable liquid crystal material and shows the nematic phase can be formed on the second alignment layer 3b. Since such a reactive liquid crystal layer 6 is fixed on the second alignment layer, the anisotropy is provided to the reactive liquid crystal layer by the second alignment layer, and thereby it can function as an alignment layer for aligning the ferroelectric liquid crystal.

Moreover, polarizing plates 4a, 4b may be provided outside the substrates 1a, 1b. Thereby, the incident light beam can be a linear polarized light beam so that only a light beam polarized in the liquid crystal molecule alignment direction can be transmitted. For example, in the case the ferroelectric liquid crystal comprising the liquid crystal layer 5 shows the mono-stability driving characteristic, by controlling the transmitted light amount by the applied voltage, the graduation display can be enabled.

Figure 4:
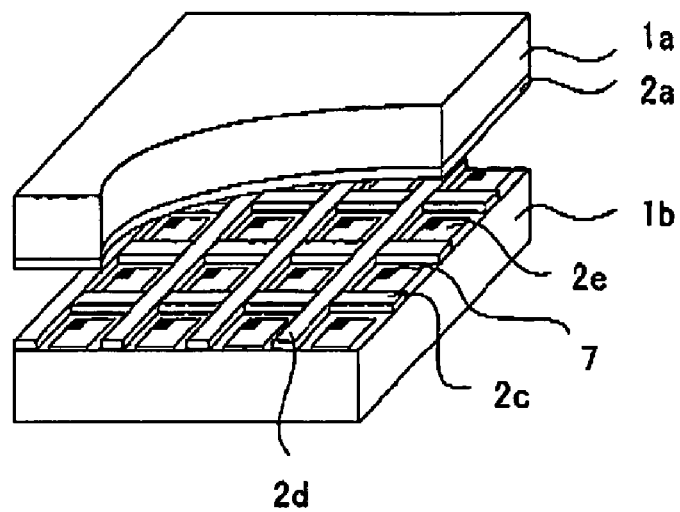
FIG. 4 is a schematic perspective view illustrating one example of the liquid crystal display of the present invention.
Figure 5:
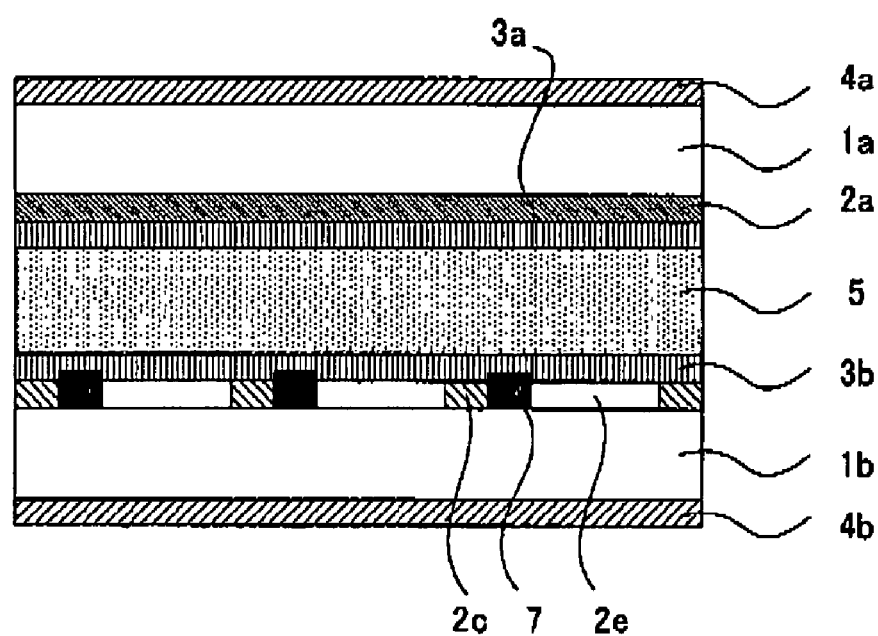
FIG. 5 is a schematic sectional view illustrating the example of the liquid crystal display of the present invention.

It is preferable that the liquid crystal display of the present invention comprises a combination of one of the substrates as a TFT substrate with the thin film transistor (TFT element) disposed in a matrix and the other substrate as a common electrode substrate with the common electrode formed in the entire area so as to be of the active matrix drive as shown in, for example, FIGS. 4 and 5. Since the liquid crystal display of the present invention is of the active matrix drive, a targeted pixel can be turned on or off surely, a high quality display can be obtained. Such a liquid crystal display off the active matrix drive using the TFT element will be explained hereinafter.

FIG. 4 is a schematic perspective view showing an example of the liquid crystal display of the present invention, and FIG. 5 is a schematic cross-sectional view thereof. In FIG. 4, one of the substrates comprises the first electrode layer 2a as a common electrode so as to provide a common electrode substrate. On the other hand, the counter substrate comprises an x electrode 2c, a y electrode 2d and a pixel electrode 2e as the second electrode layer 2b so as to provide a TFT substrate. In the liquid crystal display, the x electrodes 2c and the y electrodes 2d are arranged each vertically and laterally. By applying a signal to these electrodes, the TFT elements 7 are operated so as to drive the ferroelectric liquid crystal. The intersections of the x electrodes 2c and the y electrodes 2d are insulated by an unshown insulating layer so that the signal for the x electrodes 2c and the signal for the y electrodes 2d can be operated independently. A portion surrounded by the x electrodes 2c and the y electrodes 2d is a pixel as the smallest unit for driving the liquid crystal display of the present invention. In each pixel, at least one TFT element 7 and a pixel electrode 2e are formed. According to the liquid crystal display of the present invention, by successively applying a voltage to the x electrodes 2c and the y electrodes 2d, the TFT element 7 of each pixel can be operated.

The liquid crystal display of the present invention can be used as a color liquid crystal display by adopting the color filter system or the field sequential color system. In particular, it is preferably driven by the field sequential color system. The field sequential color system is for enabling the color display by switching on or off the liquid crystal synchronously with flickering of the LED of the three colors of red, green and blue without the use of a color filter. Thereby, a bright, highly precise color moving image display can be realized with a low power consumption, a low cost and a wide view angle.

In this case, the ferroelectric liquid crystal is preferably one showing the mono-stability driving characteristic. It is particularly preferably one of the half-V-shaped drive with the liquid crystal molecules operated only at the time either a positive voltage or a negative voltage is applied. As the ferroelectric liquid crystal, by using such material, the light leakage at the time of the dark part operation (black and white shutter aperture closed) can be reduced so that the opening time as the black and white shutter can be made sufficiently long. Thereby, each color to be switched by a time duration can be displayed further brightly so that a bright color liquid crystal display can be obtained.

On the other hand, in the case of providing a color liquid crystal display by adopting the color filter system, a micro color filter disposed as a matrix of the TFT elements 7 may be formed between the first electrode layer 2a as the common electrode and the substrate 1a.

The liquid crystal display of the present invention is not particularly limited as long as it has the configuration mentioned above. However, as the preferable embodiments, the following can be cited: a first embodiment comprising the first alignment layer and the second alignment layer as the columnar alignment layer, wherein the normal direction of the plate-like molecule of the first alignment layer and the normal direction of the plate-like molecule of the second alignment layer are disposed substantially parallel, and the constituent materials of the first alignment layer and the second alignment layer have compositions different with each other: a second embodiment comprising the first alignment layer and the second alignment layer as the columnar alignment layer, wherein the normal direction of the plate-like molecule of the first alignment layer and the normal direction of the plate-like molecule of the second alignment layer are disposed substantially perpendicularly, and a reactive liquid crystal layer produced by fixing a reactive liquid crystal including a polymerizable liquid crystal material and showing the nematic phase on the counter surface of the first alignment layer or the second alignment layer is provided: and a third embodiment comprising the first alignment layer as the columnar alignment layer and the second alignment layer as a photo alignment layer. Hereinafter each embodiment will be explained in detail.

1. First Embodiment

First, the first embodiment of the liquid crystal display of the present invention will be explained. The liquid crystal display of the first embodiment comprises the first alignment layer and the second alignment layer as the columnar alignment layer, wherein the normal direction of the plate-like molecule of the first alignment layer and the normal direction of the plate-like molecule of the second alignment layer are disposed substantially parallel, and the constituent materials of the first alignment layer and the second alignment layer have compositions different with each other.

Such a liquid crystal display of the first embodiment will be explained hereinafter. FIG. 1A shows an example of the liquid crystal display of the first embodiment of the present invention. In the figure, the first alignment layer 3a and the second alignment layer 3b are the columnar alignment layer. In this embodiment, since the first alignment layer and the second alignment layer are the columnar alignment layer, the ferroelectric liquid crystal is aligned by a simple method without the need of the rubbing process or the photo alignment process.

Figure 3A:
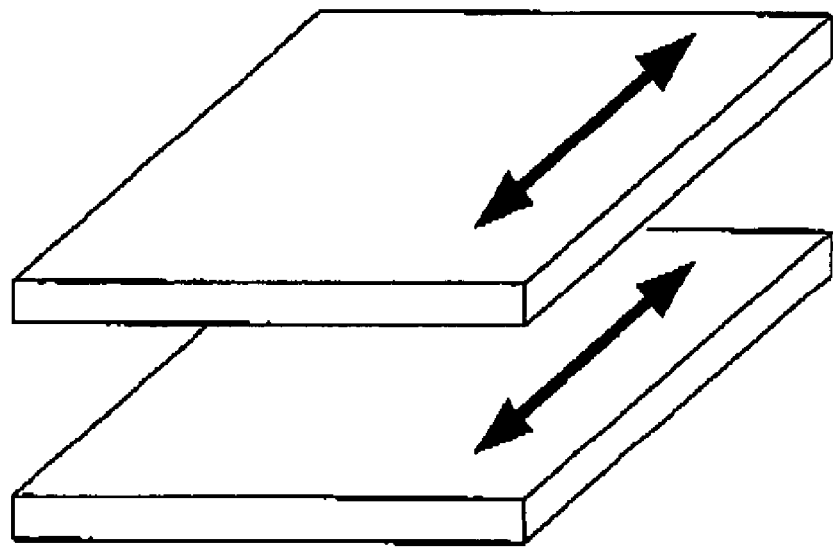
FIGS. 3A to 3B are diagrams for explaining the arrangement of the first alignment layer and the second alignment layer used in the present invention.

As shown in FIG. 3A, the first alignment layer and the second alignment layer are disposed such that the normal direction of the plate-like molecule of the first alignment layer 3a and the normal direction of the plate-like molecule of the second alignment layer 3b are substantially parallel. Here, "substantially parallel" denotes that the angle θ formed by the normal direction of the plate-like molecule of the first alignment layer 3a and the normal direction of the plate-like molecule of the second alignment layer 3b is in a range of 0° to 5°. It is preferable that the angle θ is in a range of 0° to 1° because the smaller the angle θ is, the higher the alignment ability of the columnar alignment layer so that the alignment of the ferroelectric liquid crystal can be controlled more effectively.

Furthermore, although the constituent materials of the first alignment layer and the second alignment layer may either be same or different. In this embodiment, the constituent materials of the first alignment layer and the second alignment layer have compositions different with each other. Since the compositions of the constituent materials of the first alignment layer and the second alignment layer are different, the interaction between the alignment layers and the ferroelectric liquid crystal can be reinforced so that the alignment defects can hardly be generated. Particularly in the case a ferroelectric liquid crystal showing the phase transition sequence without the smectic A phase (SmA) is used, since generation of the double domains can be restrained, the mono-domain alignment of the ferroelectric liquid crystal can be obtained thereby. Hereinafter, each constituent member of this embodiment and the manufacturing method will be explained.

(1) Each Constituent Member a. First Alignment Layer and Second Alignment Layer

First, the first alignment layer and the second alignment layer used in the liquid crystal display of the first embodiment of the present invention will be explained.

In the first embodiment, the first alignment layer and the second alignment layer have the alignment ability, and they are the columnar alignment layer having a column structure with plate-like molecules laminated in a state with the normal directions of the plate-like molecules aligned in a certain direction of the substrate, and the constituent materials of the columnar alignment layers used for the first alignment layer and the second alignment layer have compositions different with each other.

Since the columnar alignment layers used in this embodiment have a column structure with plate-like molecules laminated in a state with the normal directions of the plate-like molecules aligned in a certain direction of the substrate, according to the interaction of the column structure comprising the plate-like molecule and the ferroelectric liquid crystal, the ferroelectric liquid crystal can be aligned. Such a columnar alignment layer has the alignment ability of controlling the alignment of the ferroelectric liquid crystal without the alignment process such as the rubbing process and the photo alignment process. Thus it is advantageous in that the production process is simple and the apparatus cost can be cut back.

The columnar alignment layer is not particularly limited as long as it has the alignment ability and the column structure so that it may either be a single layer with the column structure formed or one having a resin layer with a concave part or a convex part having a predetermined width formed in a pattern on the surface and the column structure comprising plate-like molecule formed along the concave part of the resin layer. For example, in the case the columnar alignment layer comprises the resin layer and the column structure, since the column structure is formed along the concave part of the resin layer, it is advantageous in that the column structure can be aligned easily in a certain direction. Accordingly, the columnar alignment layer may be one having the column structure comprising the plate-like molecule formed on the resin layer having a pattern of a concave part or a convex part. On the other hand, in the case the columnar alignment layer is a single layer having the column structure formed, by coating a columnar alignment layer forming coating solution by, for example, a method with the shearing stress applied, the column structure can be aligned easily in a certain direction. Thus, it is advantageous in that the columnar alignment layer can be formed further easily. Hereinafter, the column structure and the resin layer will be explained.

(Column Structure)

First, the column structure comprising the columnar alignment layer will be explained. The column structure used in this embodiment is to be formed on a pattern of a concave part or a convex part on the resin layer. The column structure comprises plate-like molecules laminated with the normal directions thereof aligned in a certain direction of the substrate.

The "plate-like molecule" here denotes those having at least a plurality of aromatic ring structures with the core portion of the molecules disposed flatly.

The plate-like molecule used in the present embodiment is not particularly limited as long as it forms a column structure by being laminated like a pillar.

As the plate-like molecule, for example, plate-like molecule having a hydrophilic group such as a sulfonic acid group, or plate-like molecule having a hydrophobic group such as a long chain alkyl group can be presented. In particular, it is preferable to use the plate-like molecule having a hydrophilic group. According to the plate-like molecule having a hydrophilic group, since the hydrophilic group is small so that the distance between the adjacent column structures is close, the column structures can be arranged easily. Moreover, by neutralizing the hydrophilic part of the sulfonic acid group, or the like after coating and drying so as to be poor soluble or insoluble to water, the fixing process can be facilitated.

As the hydrophilic group, sulfonic acid based hydrophilic groups such as a sulfonic acid group, a sodium sulfonate group, an ammonium sulfonate group, a lithium sulfonate group and a potassium sulfonate group, carboxylic acid based hydrophilic groups such as a carboxyl group, a sodium carboxylate group, an ammonium carboxylate group, a lithium carboxylate group, and a potassium carboxylate group, a hydroxyl group, an amino group, or the like can be presented. Among these examples, the sulfonic acid based hydrophilic groups are preferable.

The formation of the column structure by the plate-like molecule can be confirmed by the measurement using an X ray diffractometer.

Among the example, as the plate-like molecule used in the present embodiment, those capable of forming the column structure in a solution so as to show the lyotropic liquid crystal phase are preferable because the plate-like molecule showing the lyotropic liquid crystal phase in a solution have a high self organization force. For example, by coating a columnar alignment layer forming coating solution containing the plate-like molecule which shows the lyotropic liquid crystal phase in a solution, the column structure can easily be aligned, utilizing the self organization of the plate-like molecule.

As the plate-like molecule showing the lyotropic liquid crystal phase in a solution, the plate-like molecule showing the lyotropic liquid crystal phase in an aqueous solution, and the plate-like molecule which shows the lyotropic liquid crystal phase in an organic solvent can be presented. The kind of the solutions differs depending on the substituent of the plate-like molecule. In the case the plate-like molecule has a hydrophilic group such as a sulfonic acid group, an aqueous solution is used, and in the case it has a hydrophobic group such as a long chain alkyl group, an organic solvent is used.

In the embodiment, in particular, it is preferable to use the plate-like molecule which forms a column structure in an aqueous solution and shows the lyotropic liquid crystal phase. Since such plate-like molecule forms the column structure by the self organization in an aqueous solution and shows the lyotropic liquid crystal phase, by coating the columnar alignment layer forming coating solution containing the plate-like molecule, the column structure can easily be aligned. Furthermore, since the plate-like molecule is water soluble, the fixing process for fixing the column structure can be facilitated.

Such plate-like molecule may have the dichroism or they may be those not having the dichroism. For example, in the case the plate-like molecule not having the dichroism are used, since the columnar alignment layer to be obtained does not have the polarizing ability, it is advantageous in that the arrangement with respect to the polarizing plate needs not be considered. On the other hand, in the case a material having the dichroism is used for the plate-like molecule, the polarizing direction of the polarizing plate and the normal direction of the plate-like molecule may be arranged substantially parallel. According to the arrangement, the polarizing function of the polarizing plate may not be inhibited by the polarizing ability of the columnar alignment layer.

As the specific examples of the plate-like molecule to form a column structure in an aqueous solution, showing the lyotropic liquid crystal phase and having the dichroism as mentioned above, the substances represented by the below-mentioned chemical formulae can be presented.

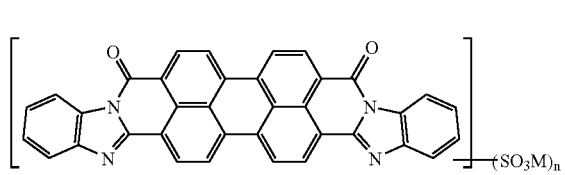
I
M is a cation.
n is an integer from 2 to 4.
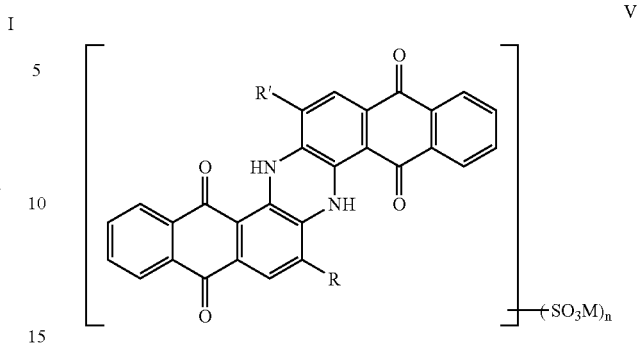
V
R is H or Cl.
R' is H or an alkyl group.
M is a cation.
n is an integer from 2 to 4.
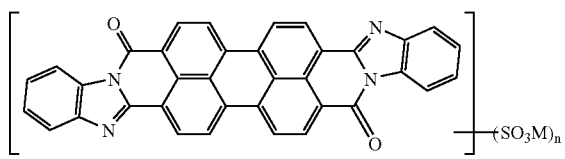
II
M is a cation.
n is an integer from 2 to 4.
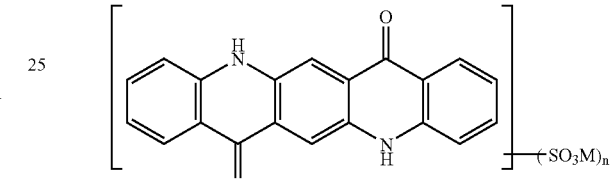
M is a cation.
n is an integer from 2 to 4.
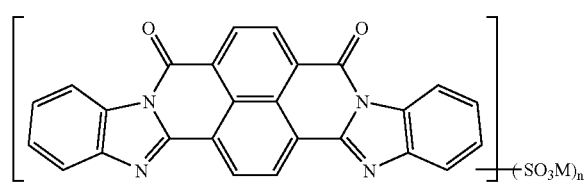
III
M is a cation.
n is an integer from 2 to 4.
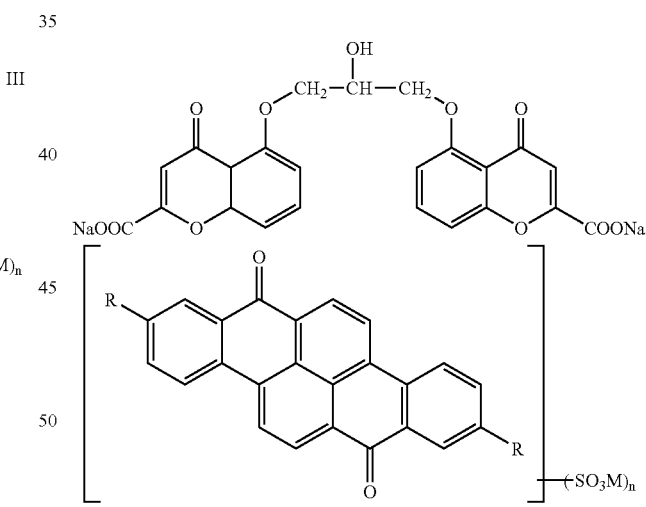
R is H, Br, NHAr, or
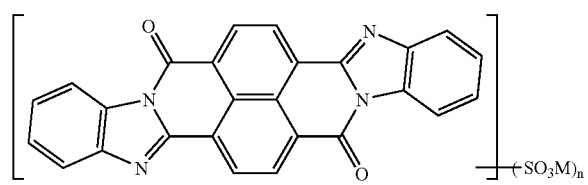
IV
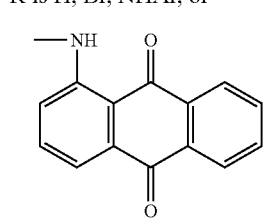
M is a cation.
n is an integer from 2 to 4.
M is a cation.
n is an integer from 2 to 4.

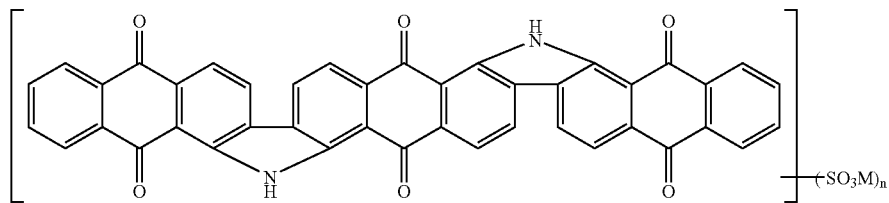
M is a cation.
n is an integer from 2 to 4.
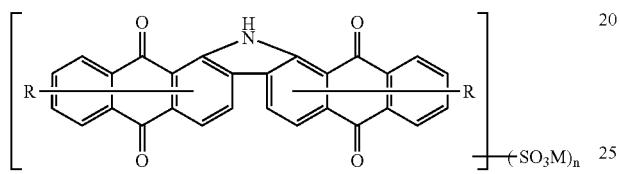
R is H or NHCOPh.
M is a cation.
n is an integer from 2 to 4.
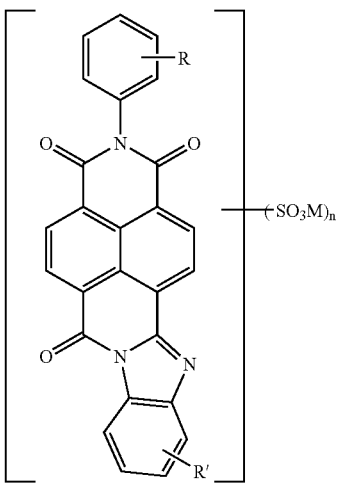
R, R' are H, a halogen, an alkyl group, an alkoxy group, ArNH, or OPh.
M is a cation.
n is an integer from 2 to 4.
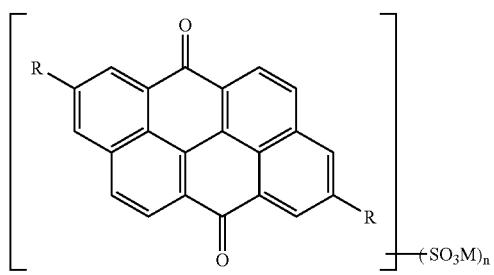
R is H, Br, NHAr, or
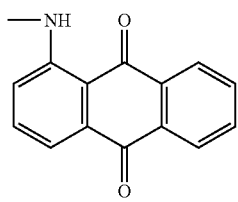
M is a cation.
n is an integer from 2 to 4.
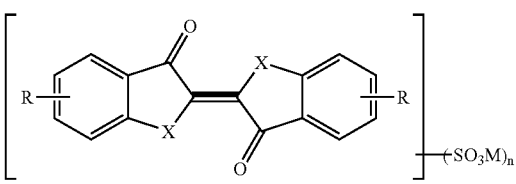
R, R' are H, a halogen, an alkyl group, an alkoxy group, ArNH, or OPh.
M is a cation.
n is an integer from 2 to 4.

X is NH or S.
R is a halogen or an alkoxy group.
M is a cation.
n is an integer from 2 to 4,

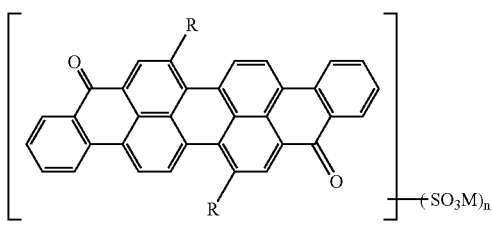

R is H, OH, or OCH$_3$.
M is a cation.
n is an integer from 2 to 4.

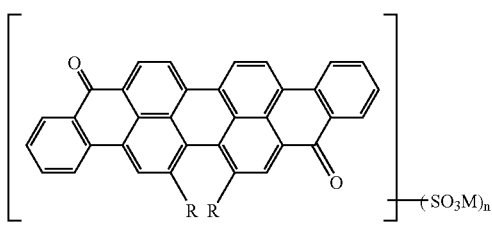

R is H, OH, or OCH$_3$.
M is a cation.
n is an integer from 2 to 4.

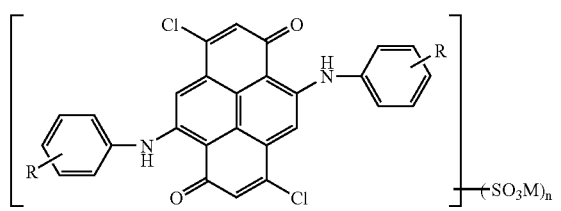

R is H, a halogen, an alkyl group, an alkoxy group, ArNH, or OPh.
M is a cation.
n is an integer from 2 to 4.

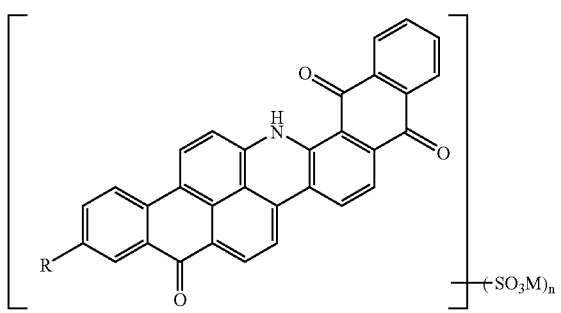

R is H, Br, NHAr, or

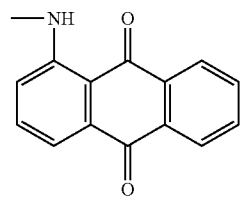

M is a cation.
n is an integer from 1 to 3.

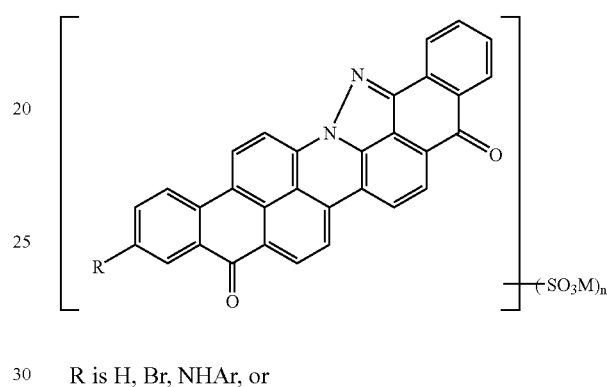

R is H, Br, NHAr, or

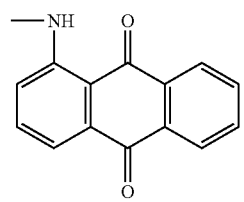

M is a cation.
n is an integer from 2 to 4.

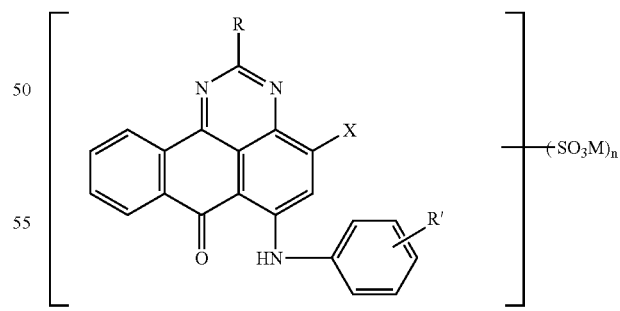

X is H, Br, or SO$_3$M.
R is H or an alkyl group.
R' is H, a halogen, an alkyl group, an alkoxy group, NHPh, or OPh.
M is a cation.
n is an integer from 2 to 4.

17
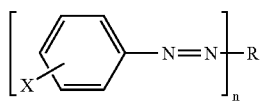
X is COOM or PO(OM)$_2$.
R', R" are H, or a halogen.
Y is NH$_2$ or OM.
M is a cation.
n is 1 or 2.
R is
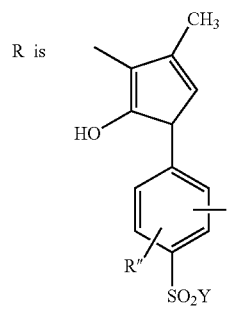
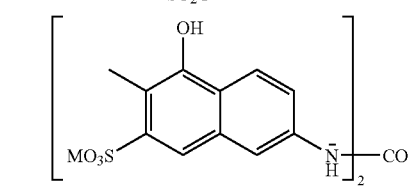
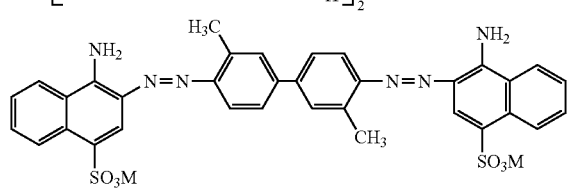
M is a cation.
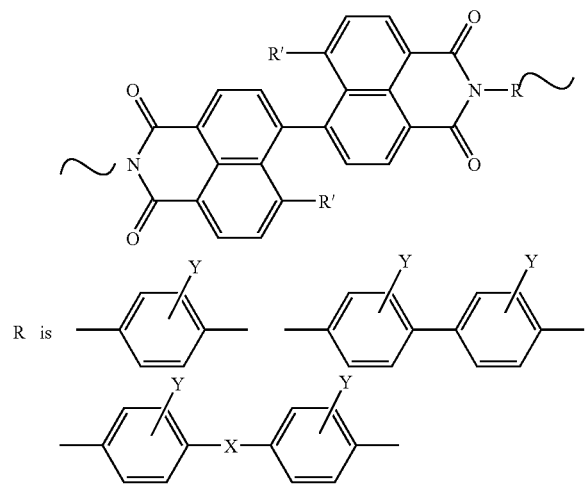
X is O, CH$_2$, NH, CONH, NHCONH, or CH=CH.
Y is H, CH$_3$, CH$_3$O, COOM, or SO$_3$M.
18
R' is H, NO$_2$, COOM, or SO$_3$M.
M is a cation.
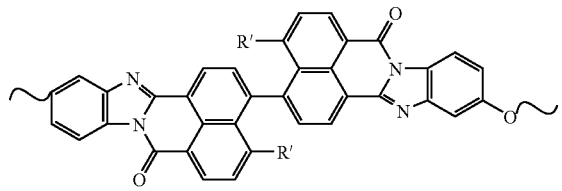
R' is COOM or SO$_3$M.
M is a cation.
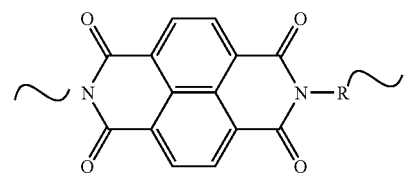
R is
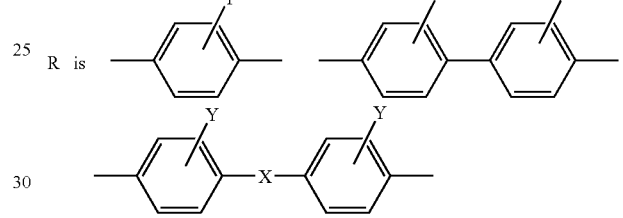
X is O, CH$_2$, NH, CONH, NHCONH, or CH=CH.
Y is COOM or SO$_3$M.
M is a cation.
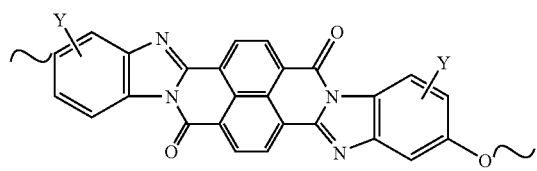
Y is SO$_3$M.
M is a cation.
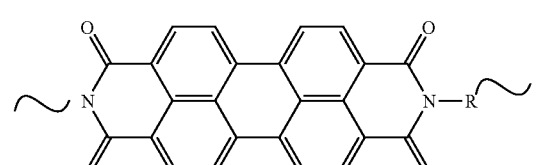
R is
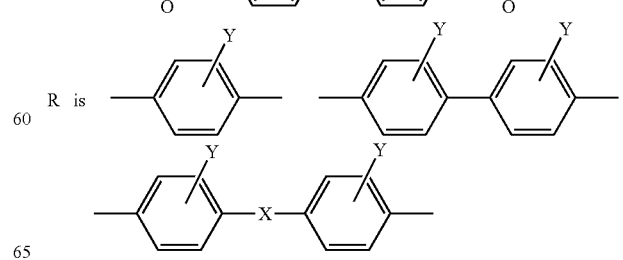

X is O, CH$_2$, NH, CONH, NHCONH, or CH=CH.
Y is COOM or SO$_3$M.
M is a cation.

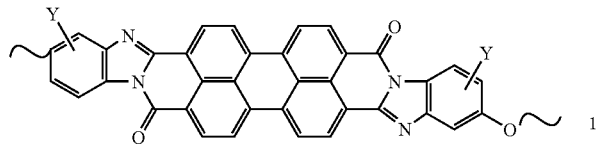

Y is SO$_3$M.
M is a cation.

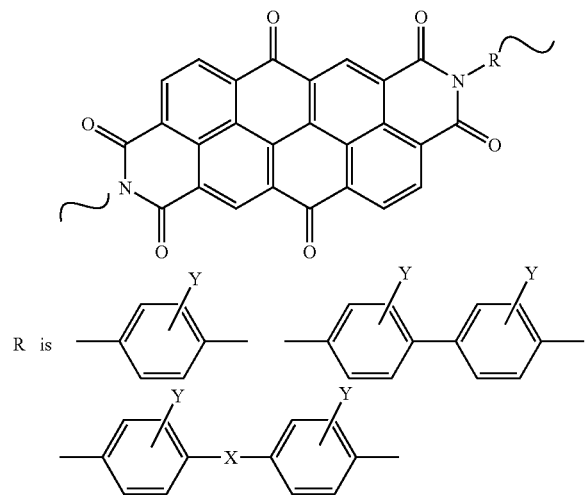

X is O, CH$_2$, NH, CONH, NHCONH, or CH=CH.
Y is COOM or SO$_3$M.
M is a cation.

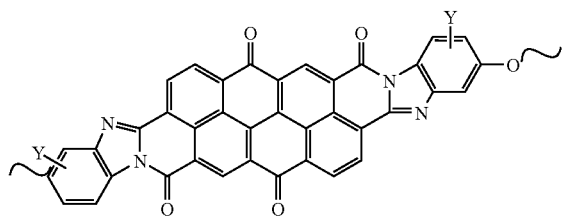

Y is COOM or SO$_3$M.
M is a cation.

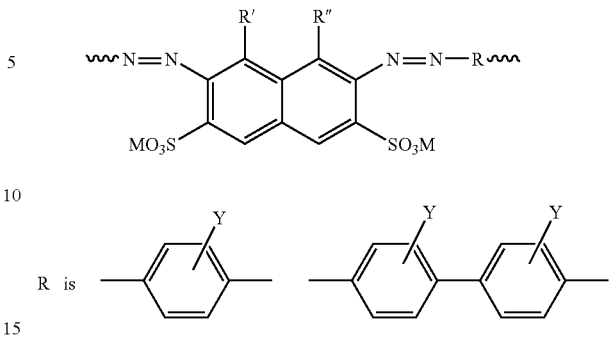

X is O, CH$_2$, NH, CONH, NHCONH, or CH=CH.
Y is H, CH$_3$, CH$_3$O, COOM, or SO$_3$M.
R', R" are OH or NH$_2$.
M is a cation.

~A-R~

A is one of the following a, b, c, d, e, f, g, or h.

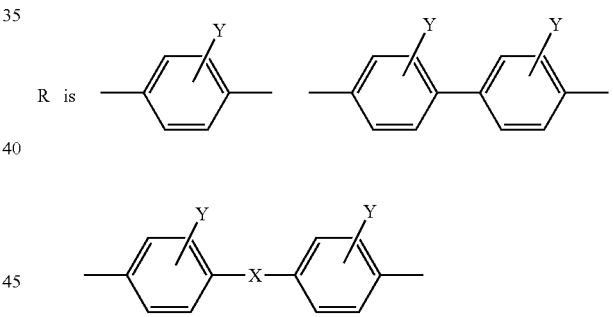

X is O, CH$_2$, NH, CONH, NHCONH, or CH=CH.
Y is COOM or SO$_3$M.
M is a cation.

a

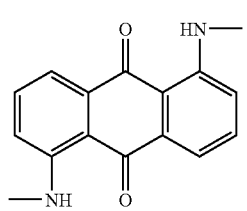

-continued
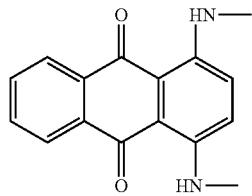
b
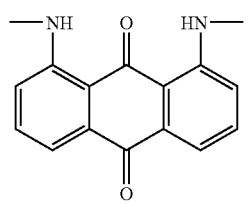
c
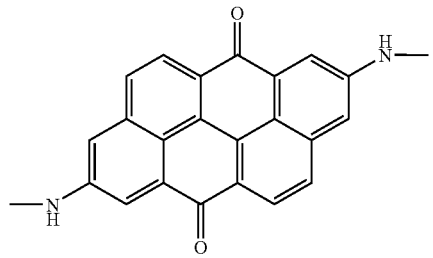
d
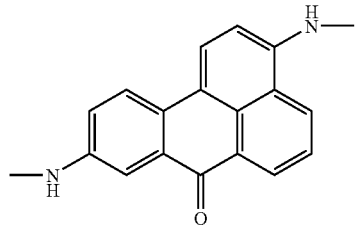
e
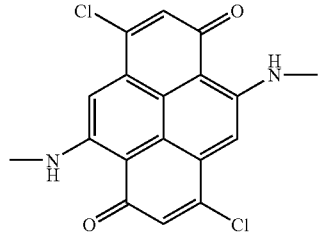
f
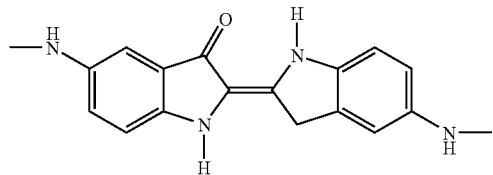
g
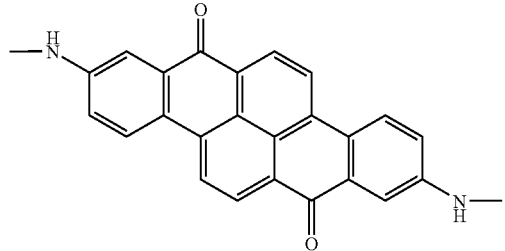
h

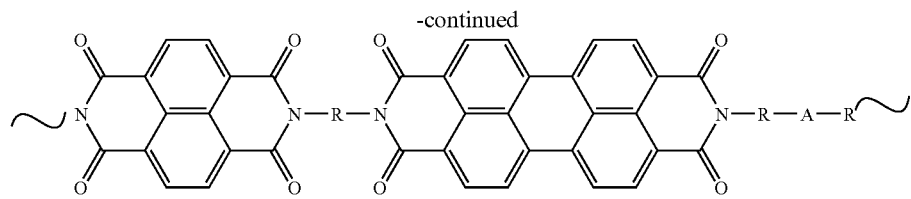
A is one of the following a, b, c, d, e, f, g, or h.
R is 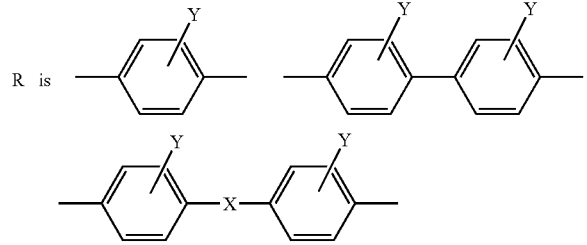
X is O, CH$_2$, NH, CONH, NHCONH, or CH=CH.
Y is COOM or SO$_3$M.
M is a cation.
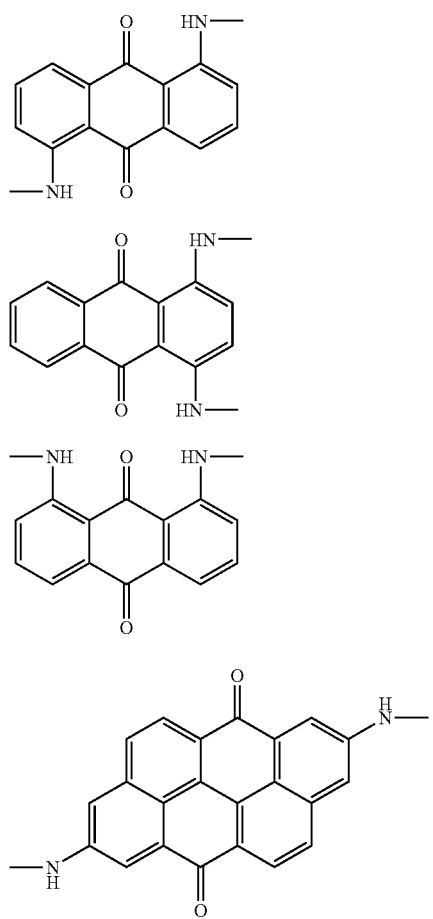
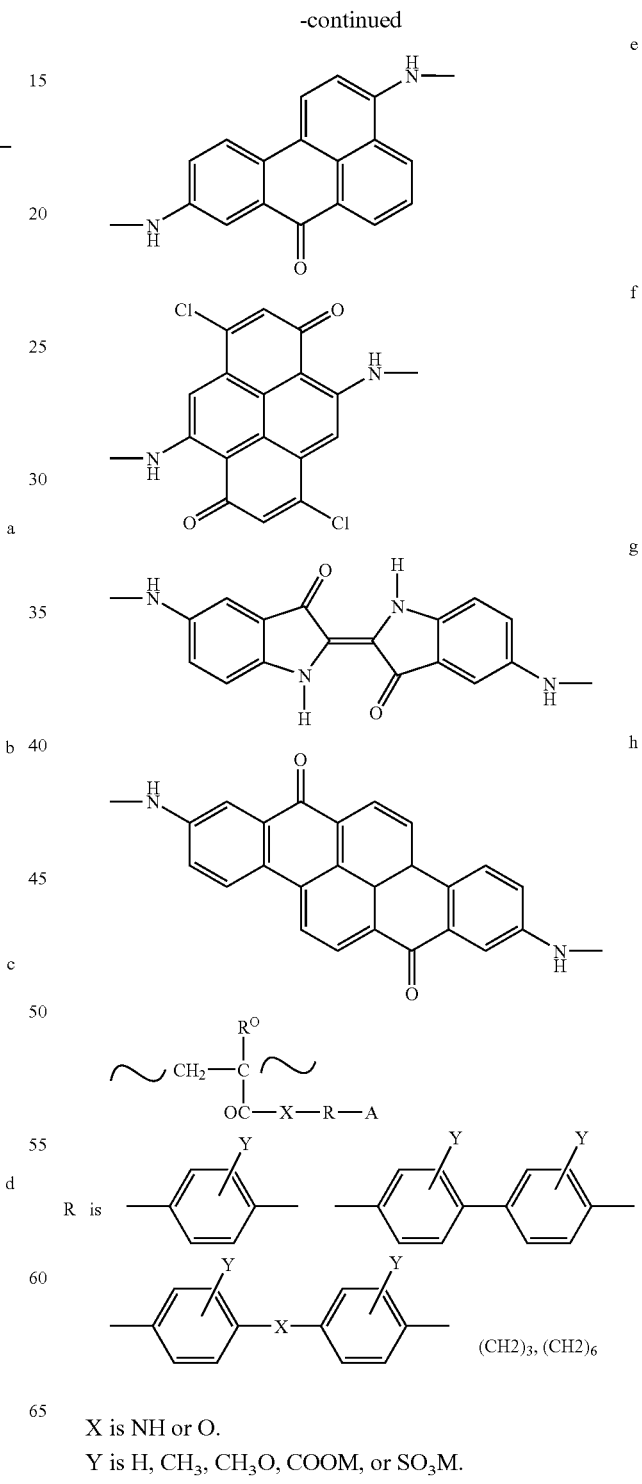
X is NH or O.
Y is H, CH$_3$, CH$_3$O, COOM, or SO$_3$M.

M is a cation.
$R^O$ is H or $CH_3$.
A is one of the following a, b, c, d, e, or f.
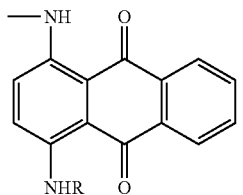
a
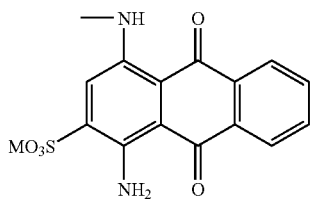
b
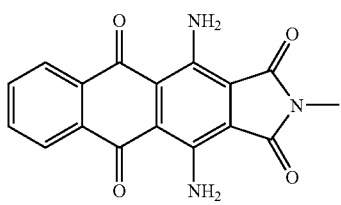
c
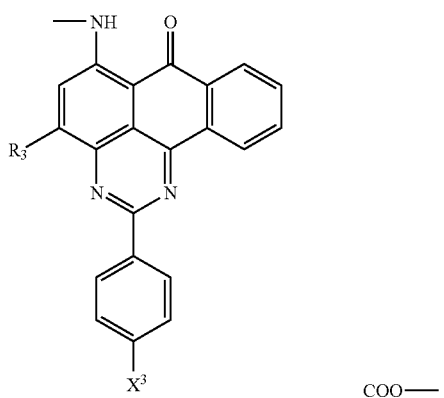
d
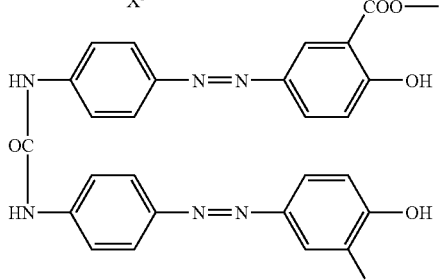
e
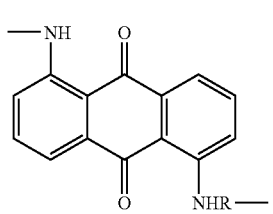
f
$R^3$ is H, Br, or $SO_3M$.
$X^3$ is H or $SO_3M$.
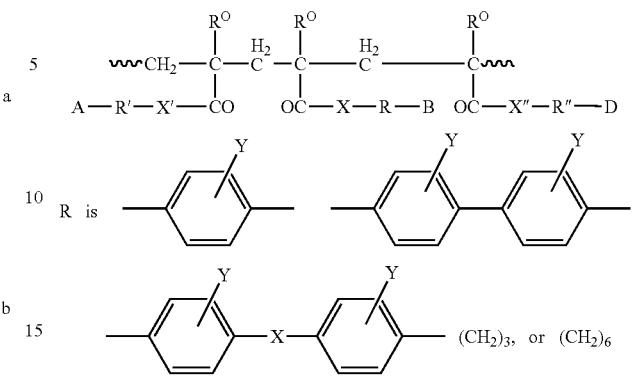
X, X', X" are NH or O.
Y is H, $CH_3$, $CH_3O$, COOM, or $SO_3M$.
M is a cation.
$R^O$ is H or $CH_3$.
A, B, D is one of the following a, b, c, d, e, or f.
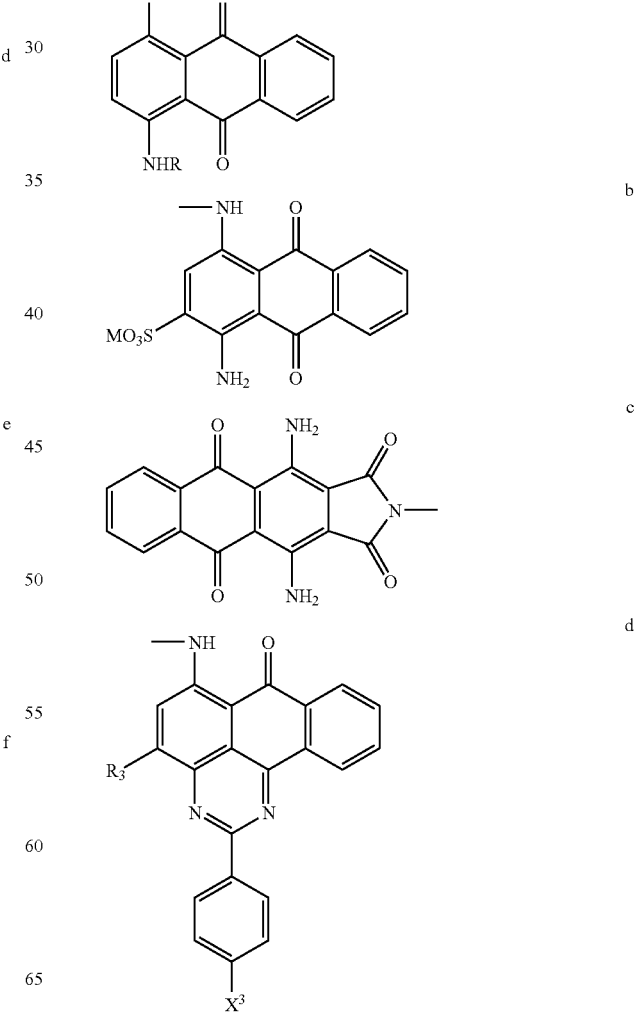

-continued
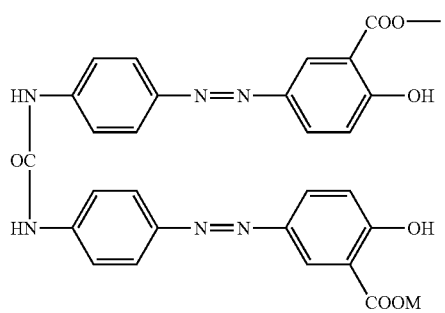
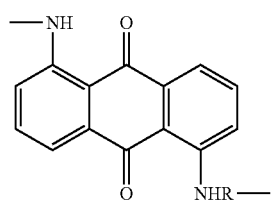
R³ is H, Br, or SO₃M.
X³ is H or SO₃M.
e
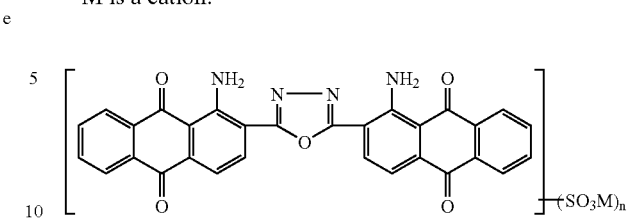
n is 2.
M is a cation.
f
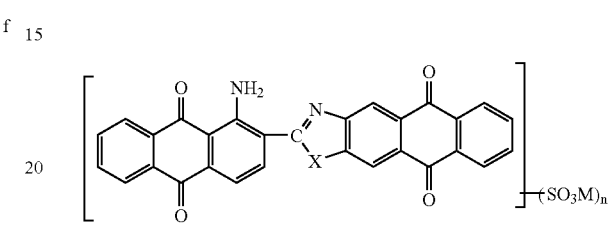
n is 2 or 3.
M is a cation.
n is an integer from 2 to 4.
M is a cation.
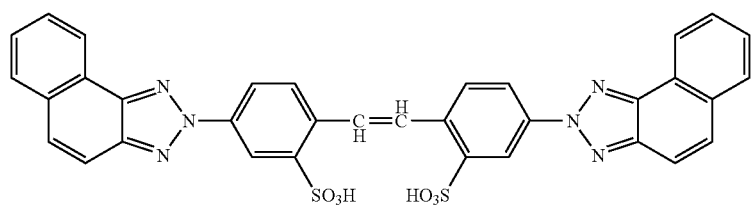
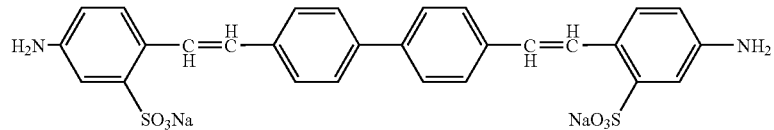
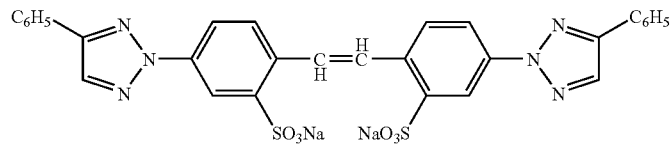
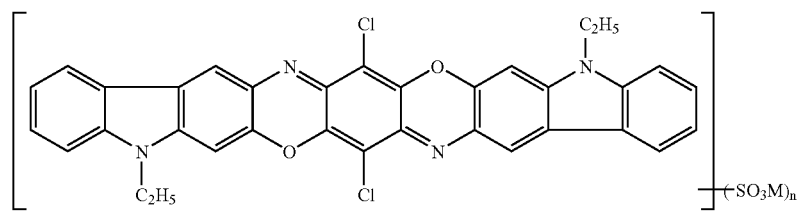

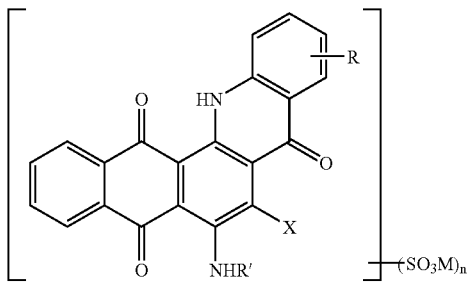

n is 2.

M is a cation.

R, R' are H, Cl, an alkyl group, or an alkoxy group.

It is preferable that the alkyl group in each of the chemical formula has 1 to 4 carbon atom. Moreover, the halogen in each of the chemical formula is preferably Cl or Br. Furthermore, as the cation in each of the chemical formula, $H^+$, $Li^+$, $Na^+$, $K^+$, $Cs^+$ or $NH_4^+$ can be presented.

Among the substances, the substances represented by the chemical formulae I to V can be used preferably as the plate-like molecule having the dichroism used in this embodiment.

Furthermore, as the material containing the plate-like molecule having the dichroism, for example, "N015", "Y105", or the like produced by Optiva Inc. can be presented.

Moreover, the plate-like molecule is not limited to those showing the lyotropic liquid crystal phase as mentioned above but also those showing the thermotropic liquid crystal phase may be used as well.

The above-mentioned substances may be used either alone by one kind or as a combination of two or more kinds. In this embodiment, according to the selection from the substances based on the demanded characteristics, the constituent materials of the first alignment layer and the second alignment layer may have compositions different with each other. In the case two or more kinds of the substances are used as a combination, the compositions may be different also by changing the combination, or by changing the addition amounts of each substance even in the case of using the same combination.

(Resin Layer)

Next, the resin layer used in this embodiment will be explained. The resin layer used in this embodiment has a concave part or a convex part having a predetermined width formed in a pattern as mentioned above. The pattern shape of the concave part or the convex part is not particularly limited as long as the plate-like molecule can form the column structure. In particular, it is preferably a pattern with the concave part or the convex part formed regularly by a certain interval as stripes.

The width of the concave part differs depending upon the kind of the plate-like molecule to be used, or the like. It is in general in a range of 0.1 μm to 10 μm, preferably in a range of 0.2 μm to 1 μm, and particularly preferably in a range of 0.2 μm to 0.4 μm. It is difficult to form the concave part width narrower than the range mentioned above in terms of the production method, and on the contrary, it may be difficult to align the column structure it the concave part width is too wide.

Moreover, the depth of the concave part is in a range of 0.05 μm to 1 μm, particularly preferably in a range of 0.1 μm to 0.2 μm. In the case the depth of the concave part is too shallow the function of align the plate-like molecule comprising the column structure is deteriorated, and in the case the concave part is too deep, an adverse effect can be cast on the alignment of the ferroelectric liquid crystal.

Here, the interval at the time of forming the concave part as the stripes differs depending on the kind of the plate-like molecule to be used, or the like. It is in general the interval between the ends of the adjacent concave parts, that is, the width of the convex part is half or less of the visible light wavelength, preferably in a range of 0.05 μm to 2 μm, more preferably in a range of 0.1 μm to 1 μm, and particularly preferably in a range of 0.1 μm to 0.2 μm. It is difficult to form the interval between the adjacent concave parts narrowly in terms of the production method, and it may be difficult to align the column structure if it is too wide. Moreover, if the interval between the adjacent concave parts is a value close to the wavelength of the light beam, optical problems such as coloring can be involved due to the diffraction of the light beam.

Moreover, the pitch of the concave parts can be selected optionally according to the kind of the plate-like molecule to be described later, or the like. It is in general in a range of 0.1 μm to 10 μm, preferably in a range of 0.2 μm to 1 μm, and particularly preferably in a range of 0.2 μm to 0.4 μm. It is difficult to form the interval between the adjacent concave parts narrowly in terms of the production method, and it may be difficult to align the column structure if it is too wide. Here, the "pitch of the concave parts" refers to the distance from the center to the center of the adjacent concave parts.

The cross-sectional shape of the concave part of the resin layer is not particularly limited, and it may be rectangular, trapezoid, or other shapes. In the present invention, it is particularly preferable that the cross-sectional shape of the concave part is rectangular because the column structure can easily be oriented and aligned in a certain direction.

Such a resin layer having the concave part or the convex part can be formed by for example preparing a concave part forming substrate having a convex part symmetrical to the shape of the targeted concave part on the surface and a concave part forming substrate for forming the resin layer by interposing a hardening resin composition with respect to the concave part forming substrate and hardening the same, laminating the concave part forming substrate and the concave part forming substrate with the hardening resin composition coated thereon so as to interpose the hardening resin composition, hardening the hardening resin composition, and removing the concave part forming substrate.

As the hardening resin used for the hardening resin composition, for example, hardening resins such as an unsaturated polyester, a melamine, an epoxy, a polyester (meth) acrylate, a urethane (meth)acrylate, an epoxy(meth)acrylate, a polyether (meth)acrylate, a polyol (meth)acrylate, a melamine (meth) acrylate, and a triazine based acrylate can be used alone or as a mixture. Moreover, the resin composition may either be a thermosetting resin or a ultraviolet ray curable resin, or a combination thereof.

Moreover, as needed, various kinds of additives such as a hardening agent and a photo polymerization initiating agent may be added to the resin composition. Moreover, the viscosity thereof may be adjusted using a solvent, a monomer, or the like for the application onto the concave part forming substrate.

As to the film thickness of the resin layer, in general, the thickness of the portion with the concave part formed is 1 μm or less, and it is preferably 0.2 μm or less. In the case the thickness of the portion with the concave part formed is too thick, the liquid crystal display of the present invention may be thick and heavy. Moreover, in consideration to realize the thin shape of the liquid crystal display, the thickness of the portion with the concave part formed is preferably thin, however, since it is difficult to form a product too thin, the thickness of the portion with the concave part formed is in general 0.1 μm or more.

Here, in the present invention, in the case of copying such a rugged structure, in general, the formed resin layer surface may have a high water repellency, however, since the columnar alignment layer forming coating solution is to be coated onto the resin layer, it is preferable that the resin layer is hydrophilic. Therefore, a hydrophilic layer may be provided onto the resin layer, or the hydrophilic process may be applied to the resin layer surface. As a method of the surface treatment for the resin layer surface to make it lyophilic, a lyophilic surface treatment by the plasma process utilizing an argon, water, or the like can be presented. Moreover, as the lyophilic layer to be formed onto the resin layer, for example a silica film formed by the sol gel process of a tetraethoxy silane, or the like can be presented.

(Columnar Alignment Layer)

The thickness of the columnar alignment layer used in this embodiment differs depending on the characteristics demanded to the liquid crystal display. Moreover, it differs also depending on whether the columnar alignment layer comprises only the column structure or it comprises the column structure and the resin layer. For example, in the case the columnar alignment layer is a single layer having the column structure only, the thickness of the columnar alignment layer in general is preferably in a range of 2 nm to 1,000 nm, more preferably in a range of 5 nm to 500 nm, and further preferably in a range of 10 nm to 300 nm. It is difficult to form the columnar alignment layer having a too thin thickness. On the other hand, if the thickness of the columnar alignment layer is too thick, the alignment disturbance may be generated in the vicinity of the surface, and furthermore, it is not preferable in terms of the cost.

Moreover, the transmission of the columnar alignment layer is preferably 40% or more in the entire region, and it is more preferably 80% or more. The above-mentioned transmittance can be measured with a spectroradiometer (type: SR-3) produced by TOPCON CORPORATION.

Such a columnar alignment layer can be formed on the substrate in a state with the column structure maintained by forming a column structure comprising the plate-like molecule in a columnar alignment layer forming coating solution prepared by adding the plate-like molecule in a solvent, and coating the coating solution. Since the method of manufacturing the columnar alignment layer will be explained in detail in the column of the "B. Manufacturing method of the liquid crystal display" to be described later, explanation is omitted here.

b. Liquid Crystal Layer

Next, the liquid crystal layer used for the first embodiment of the present invention will be explained. The liquid crystal layer used in this embodiment comprises the two columnar alignment layers and a ferroelectric liquid crystal filled therebetween. Hereinafter, the ferroelectric liquid crystal will be explained.

(Ferroelectric Liquid Crystal)

The ferroelectric liquid crystal used in the present embodiment is not particularly limited as long as it shows the chiral smectic C (SmC*) phase. A material having the phase change of the cholesteric (Ch) phase-smectic A (SmA) phase-chiral smectic C (SmC*) phase in the temperature cooling process can also be used. Furthermore, a material having the phase change of the Ch phase-SmC* phase without transition to the SmA phase can also be used. In particular, as the ferroelectric liquid crystal used in the embodiment, one showing the latter phase transition sequence without the transition to the SmA phase is preferable. A ferroelectric liquid crystal showing such a phase transition sequence tends to show the mono-stability driving characteristic, and by using such a material showing the mono-stability driving characteristic, the graduation display is enabled so that a highly precise liquid crystal display for the color display can easily be obtained.

In particular, in the case the liquid crystal display of the present embodiment is driven by the field sequential color system, among the ferroelectric liquid crystals showing the mono-stability driving characteristic as mentioned above, it is preferable to use a ferroelectric liquid crystal of the half-V-shaped drive with the liquid crystal molecules operated only at the time either a positive voltage or a negative voltage is applied. By using a ferroelectric liquid crystal having such characteristics, the aperture time of the black and white shutter can be made longer so that a liquid crystal display of the bright color display can be obtained.

Moreover, the ferroelectric liquid crystal used in the embodiment is preferably one constituting a single phase. The word "constituting a single phase" means that a polymer network, as formed by the polymer stabilization method or the like, is not formed. Such use of the ferroelectric liquid crystal of a single phase makes it possible to simplify the production process and lowering the driving voltage.

As it will be described later, a polymer network may be formed in the liquid crystal layer used in the present embodiment.

As the specific examples of such a ferroelectric liquid crystal, "R2301", "FELIX-3206" commercially available from AZ Electronic Materials can be presented.

(Liquid Crystal Layer)

The thickness of the liquid crystal layer made of the above-mentioned ferroelectric liquid crystal is preferably from 1.2 μm to 3.0 μm, more preferably from 1.3 μm to 2.5 μm, even more preferably from 1.4 μm to 2.0 μm. If the thickness of the liquid crystal layer is too thin, the contrast may lower. Conversely, if the thickness is too thick, the liquid crystal may not be aligned with ease.

As the method for forming the liquid crystal, a method which is generally used as a method for forming a liquid crystal cell can be used. For example, the liquid crystal layer can be formed, by making use of capillary effect to insect an isotropic liquid obtained by heating the above-mentioned ferroelectric liquid crystal into a liquid crystal cell, which is formed by forming electrodes beforehand on a substrate and arranging the above-mentioned photo alignment layer, and then sealing the cell with an adhesive agent. The thickness of the liquid crystal layer can be adjusted with spacers such as beads.

According to the liquid crystal layer used in the present embodiment, a polymer network may be formed. That is, the liquid crystal layer may contain a polymerization product of a polymerizable monomer. Thereby, the sequence of the ferroelectric liquid crystal can further be stabilized.

The polymerizable monomer used for the polymerization product of the polymerizable monomer is not particularly limited as long as it is a compound capable of generating a polymerization product by the polymerization reaction. As such a polymerizable monomer, a thermosetting resin monomer capable of generating the polymerization reaction by the thermal treatment, and an active radiation curable resin monomer capable of generating the polymerization reaction by the irradiation of an active radiation can be presented. In particular, in the present invention, it is preferable to use an active radiation curable resin monomer. Since the thermosetting resin monomer requires the thermal treatment for generating the polymerization reaction, the regular sequence of the ferroelectric liquid crystal may be deteriorated or the phase transition may be induced by the thermal treatment. On the other hand, the active radiation curable resin monomer does not involve such a risk so that the sequence of the ferroelectric liquid crystal may hardly be deteriorated by the generation of the polymerization reaction.

As the active radiation curable resin monomer, an electron beam curable resin monomer capable of generating the polymerization reaction by the electron beam irradiation, and a photosetting resin monomer capable of generating the polymerization reaction by the light irradiation can be presented. In particular, according to the present invention, it is preferable to use a photosetting resin monomer. By using the photosetting resin monomer, the manufacturing method of the liquid crystal display of the present invention can be simplified.

The above-mentioned photosetting resin monomer is not particularly limited as long as it can generate the polymerization reaction by the irradiation of a light beam having the wavelength in a range of 150 nm to 500 nm. In particular, according to the present invention, it is preferable to use an ultraviolet ray curable resin monomer capable of generating the polymerization reaction by the irradiation of a light beam having the wavelength in a range of 250 nm to 450 nm, in particular, in a range of 300 nm to 400 nm because it is advantageous in terms of the irradiation device convenience, or the like.

The polymerizable functional group of the ultraviolet ray curable resin monomer is not particularly limited as long as it can generate the polymerization reaction by the irradiation of an ultraviolet ray of the wavelength range mentioned above. According to the present invention, it is preferable to use an ultraviolet ray curable resin monomer having an acrylate group.

The above-mentioned ultraviolet ray curable resin monomer may either be a monofunctional monomer having a polymerizable functional group in a molecule or a polyfunctional monomer having two or more polymerizable functional group in a molecule. In particular, according to the present invention, it is preferable to use a polyfunctional monomer. By using the polyfunctional monomer, since a stronger polymer network can be formed in the liquid crystal layer, the interatomic force and the polymer network at the first alignment layer interface can be reinforced. Therefore, by using the polyfunctional monomer, disturbance of the sequence of the ferroelectric liquid crystal by the temperature change of the liquid crystal layer can be restrained.

According to the embodiment, among the polyfunctional monomers, a bifunctional monomer having a polymerizable functional group at both ends of the molecules is preferable. Since the monomer has the functional groups on the both ends of the molecules, a polymer network with a wide interval between the polymers can be formed so that the decline of the driving voltage of the ferroelectric liquid crystal due to the presence of the polymerization product of the polymerizable monomers in the liquid crystal layer can be prevented.

According to the present embodiment, among the ultraviolet ray curable resin monomers, it is preferable to use an ultraviolet ray curable liquid crystal monomer capable of showing the liquid crystal property. Such an ultraviolet ray curable liquid crystal monomer is preferable for the following reasons. That is, since the ultraviolet ray curable liquid crystal monomer shows the liquid crystal property, it can be arranged regularly by the alignment limiting force of the first alignment layer or second alignment layer. Therefore, by generating the polymerization reaction after regularly arranging the ultraviolet ray curable liquid crystal monomers, they can be fixed while maintaining the regular arrangement state in the liquid crystal layer. Owing to the presence of the polymerization product having the regular arrangement state in the liquid crystal layer, the alignment stability of the ferroelectric liquid crystal can be improved so that the excellent heat resistance and impact resistance can be provided to the liquid crystal display of the embodiment.

The liquid crystal phase shown by the ultraviolet ray curable liquid crystal monomer is not particularly limited. For example, the nematic phase, the SmA phase and the SmC phase can be presented.

As the ultraviolet ray curable liquid crystal monomers used in the present invention, for example, the compounds represented by the following formula can be presented.

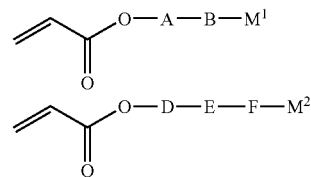

In the formula, A, B, D, E and F, which may have a substituent such as a halogen, represent a benzene, a cyclohexane or a pyrimidine. Moreover, A and B, or D and E may be coupled via a coupling group such as an acetylene group, a methylene group and an ester group. $M^1$ and $M^2$ may be any of a hydrogen atom, an alkyl group having 3 to 9 carbon atoms, an alkoxy carbonyl group having 3 to 9 carbon atoms, or a cyano group. Furthermore, an acryloyloxy group at the molecule chain end and A or D may be coupled via a spacer such as an alkylene group having 3 to 6 carbon atoms.

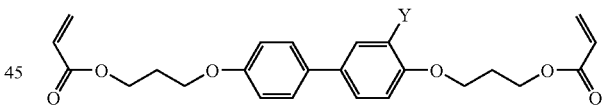

In the formula, Y represents hydrogen, an alkyl having 1 to 20 carbon atoms, an alkenyl having 1 to 20 carbon atoms, an alkyloxy having 1 to 20 carbon atoms, an alkyloxy carbonyl having 1 to 20 carbon atoms, a formyl, an alkyl carbonyl having 1 to 20 carbon atoms, an alkyl carbonyloxy having 1 to 20 carbon atoms, a halogen, a cyano or a nitro.

Among the compounds represented by the formulae, as the specific compounds to be used preferably in the present invention, the compounds of the following formulae can be presented.

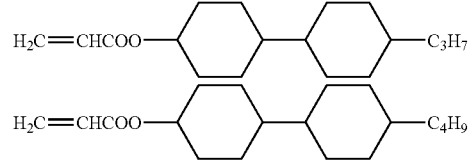

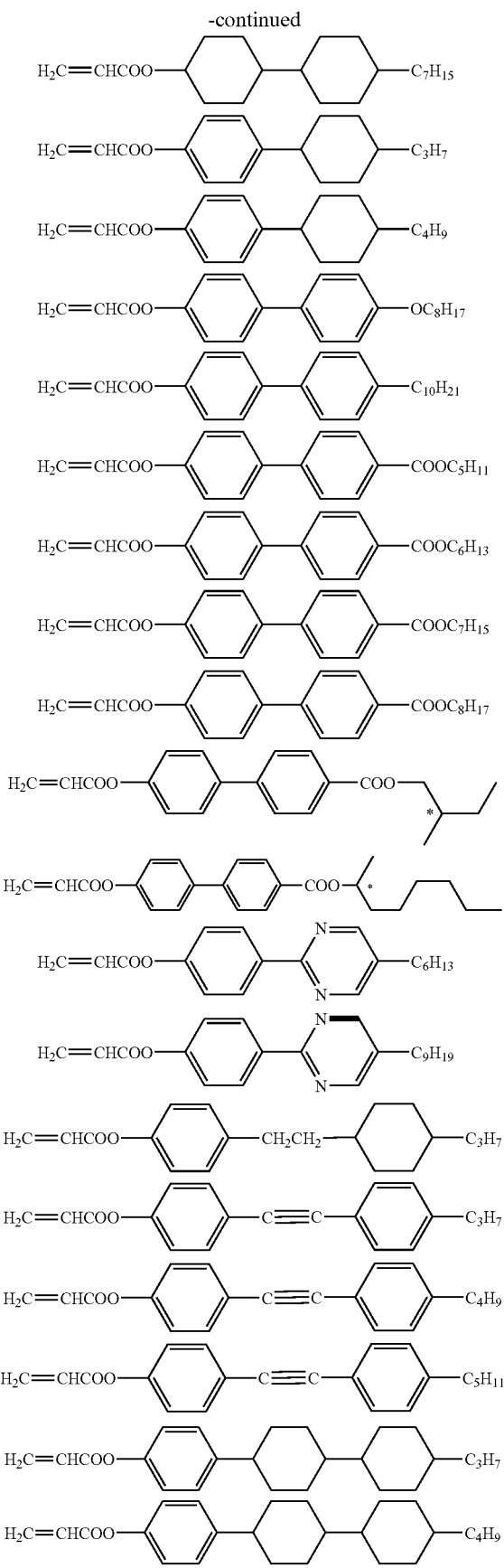

The polymerization product of the polymerizable monomers used in the present embodiment may either be a polymerization product of a single polymerizable monomer, or a polymerization product of two or more different polymerizable monomers. In the case of a polymerization product of two or more different polymerizable monomers, for example, a polymerization product of the ultraviolet ray curable liquid crystal monomer and another ultraviolet ray curable resin monomer can be presented.

In the case the ultraviolet ray curable liquid crystal monomer is used as the polymerizable monomer, a polymerization product of the polymerizable monomers used in the present invention may be a main chain liquid crystal polymer with the main chain showing the liquid crystal property owing to the presence of an atomic group showing the liquid crystal property in the main chain, moreover, it may be a side chain liquid crystal polymer with the side chain showing the liquid crystal property owing to the presence of an atomic group showing the liquid crystal property in the side chain. In particular, according to the present invention, it is preferably a side chain liquid crystal polymer. Since the degree of freedom of the atomic group can be higher owing to the presence of the atomic group showing the liquid crystal property in the side chain, the atomic group showing the liquid crystal property can easily be aligned in the liquid crystal layer. Moreover, consequently, the alignment stability of the ferroelectric liquid crystal in the liquid crystal layer can be improved.

The amount of the polymerization product of the polymerizable monomer present in the liquid crystal layer is not particularly limited as long as it is in a range capable of having the alignment stability of the ferroelectric liquid crystal to a desired degree. In general, it is preferably in a range of 0.5% by mass to 30% by mass in the liquid crystal layer, in particular it is preferably in a range of 1% by mass to 20% by mass, and especially it is preferably in a range of 1% by mass to 10% by mass. In the case it is more than the range, increase of the driving voltage of the ferroelectric liquid crystal or the deterioration of the response speed may be brought about. Moreover, in the case it is less than the range, due to the insufficiency of the alignment stability of the ferroelectric liquid crystal, the heat resistance or the impact resistance of the liquid crystal display of the present invention may be deteriorated.

Here, the amount of the polymerization product of the polymerizable monomer present in the liquid crystal layer can be calculated from the residual amount found by measuring with an electronic force balance the weight of the polymerization product of the polymerizable monomer remaining after washing out the single molecule liquid crystals in the liquid crystal layer with a solvent and the total mass of the liquid crystal layer.

In the liquid crystal layer used in the present embodiment, another compound may be included within a range not deteriorating the purpose of the present invention. As such a compound, an unreacted polymerizable monomer, a photo polymerization initiating agent, a reaction initiating agent, a reaction inhibiting agent, or the like can be presented.

c. First Substrate and Second Substrate

The first substrate and second substrate used in the present embodiment is not particularly limited as long as it is one commonly used as the substrate for the liquid crystal display. For example, a glass plate, a plastic plate, or the like can be presented preferably. The surface roughness (RSM value) of the substrate used in the embodiment is preferably 10 nm or less, it is more preferably 3 nm or less, and it is further preferably in a range of 1 nm or less. The above-mentioned surface roughness is the value measured using an atomic force microscope (AFM).

d. First Electrode Layer and Second Electrode Layer

The first electrode layer and second electrode layer used in the present embodiment is for driving the ferroelectric liquid crystal by applying a signal voltage to the ferroelectric liquid crystal.

The first electrode layer and second electrode layer are not particularly limited as long as they are those commonly used as the electrode layer of the liquid crystal display, and it is preferable that at least one of the layers is made of a transparent conductive material. As the transparent conductive material, an indium oxide, a tin oxide, an indium tin oxide (ITO), or the like can be presented preferably.

In the case the liquid crystal display of the present invention is of the active matrix drive using the TFT element, it is preferable that one of the first electrode layer and the second electrode layer is an entire surface common electrode made of the transparent conductive material and the other one comprises the x electrodes and the y electrodes arranged in a matrix so as to dispose the TFT element and the pixel electrode in the portions surrounded by the x electrodes and the y electrodes.

Out of these electrodes, the transparent conductive film to provide the entire surface common electrode can be formed on the substrate by the deposition method such as the CVD method, the sputtering method and the ion plating method. Moreover, the x electrodes and the y electrodes can be formed by forming a conductive film of a metal such as a chromium and an aluminum by the deposition method and patterning the same into a matrix. As the patterning method, a common method such as the photolithography method can be used.

e. Polarizing Plate

Next, the polarizing plate used in this embodiment will be explained. The polarizing plate used in this embodiment to be provided outside the first substrate and second substrate has the function of processing the incident light beam to be a linear polarized light beam and transmitting only the light beam polarized in the alignment direction of the liquid crystal molecules.

The polarizing plate used in the present embodiment is not limited to any especial kind if the plate is a member for transmitting only a specific direction of wave motions of light. It is possible to use a member which is generally known as a polarizing plate for liquid crystal display.

(2) Manufacturing Method of the Liquid Crystal Display

The manufacturing method of the liquid crystal display of the first embodiment will be explained. As the manufacturing method of the liquid crystal display of the embodiment, a method commonly known as a manufacturing method of the liquid crystal display can be used, and thus it is not particularly limited.

As an example of the manufacturing method of the liquid crystal display of the embodiment, the case of providing an active matrix system liquid crystal display using the TFT element will be explained as one example.

First, a transparent conductive film is formed on the first substrate by the deposition method so as to form a first electrode layer as the entire surface common electrode. On the other hand, an x electrode and a y electrode are formed on the second substrate by patterning the conductive film in a matrix and a switching element and a pixel electrode are provided so as to provide a second electrode layer.

Next, a columnar alignment layer is formed on the first electrode layer and the second electrode layer accordingly formed by the method to be described later. With beads dispersed as a spacer on one of the formed columnar alignment layers and a sealing material coated on the circumference, the two substrates are attached such that the columnar alignment layers face with each other so as to be thermally pressed. The ferroelectric liquid crystal is heated and injected in an isotropic phase or nematic phase state, utilizing the capillary effect from the injection opening of the liquid crystal cell accordingly obtained, and the injection opening is sealed with an ultraviolet ray hardening resin, or the like. Thereafter, the ferroelectric liquid crystal is aligned by gradually cooling down the same so as to form a liquid crystal layer. By attaching the polarizing plate outside the first substrate and second substrate, a liquid crystal display of the first embodiment can be obtained.

Moreover, according to the present embodiment, the liquid crystal display can be produced using the polymer stabilization method. In this case, a liquid crystal layer can be formed by a liquid crystal sealing process of sealing a liquid crystal layer forming composition including a ferroelectric liquid crystal and a polymerizable monomer between the first alignment substrate and the second alignment substrate, a liquid crystal alignment process of having the ferroelectric liquid crystal in the chiral smectic C phase state, and a polymerizing process of polymerizing the polymerizable monomer with the ferroelectric liquid crystal in the chiral smectic C phase.

In the liquid crystal sealing process, the method of sealing the liquid crystal layer forming composition including the ferroelectric liquid crystal and the polymerizable monomer is not particularly limited. For example, it can be sealed by heating the liquid crystal layer forming composition so as to process the ferroelectric liquid crystal in the liquid crystal layer forming composition into anisotropic liquid, and injecting the same utilizing the capillary effect from the injection opening of a liquid crystal cell produced preliminarily using the first alignment substrate and the second alignment substrate. In this case, the injection opening is sealed with an adhesive.

At the time, the amount of the polymerizable monomer included in the liquid crystal layer forming composition can be determined optionally according to the amount necessary for the sequence stabilization of the ferroelectric liquid crystal after the formation or the liquid crystal layer. In particular, according to the present invention, it is preferably in a range of 0.5% by mass to 30% by mass in the liquid crystal layer forming composition, it is particularly preferably in a range of 1% by mass to 20% by mass, and it is especially preferably in a range of 1% by mass to 10% by mass. In the case the polymerizable monomer content is more than the range, the liquid crystal display performance may be deteriorated due to the high driving voltage of the ferroelectric liquid crystal after the formation of the liquid crystal layer. Moreover, in the case it is lower than the range, as a result of the insufficient sequence stabilization of the ferroelectric liquid crystal, the heat resistance, the impact resistance, or the like of the liquid crystal display can be lowered.

Moreover, at the time of sealing the liquid crystal layer forming composition, the ferroelectric liquid crystal is heated to the transition temperature or higher from the chiral smectic C phase to the nematic phase. The temperature may be the transition temperature or higher from the chiral smectic C phase to the nematic phase. In general, the ferroelectric liquid crystal is heated into the state of the isotropic phase or the nematic phase. As to the specific temperature, it differs depending on the kind of the ferroelectric liquid crystal, and thus it can be selected optionally.

Next, in the liquid crystal alignment process, the sealed ferroelectric liquid crystal is cooled down. At the time, in general the ferroelectric liquid crystal is cooled down gradually to the room temperature (about 25° C.).

Moreover, in the polymerizing process, the method for polymerizing the polymerizable monomer can be determined optionally according to the kind of the polymerizable monomer. For example, in the case an ultraviolet ray curable resin monomer is used as the polymerizable monomer, polymerization can be carried out by the ultraviolet ray irradiation.

The polymerizable monomer can be polymerized either in a state with the voltage applied to the liquid crystal layer or in a state without the voltage application. In the present embodiment, it is preferable to carry out the polymerization in a state without the voltage application because the production process can be simplified further by the polymerization without the voltage application.

2. Second Embodiment

Next, the second embodiment of the liquid crystal display of the present invention will be explained. According to the liquid crystal display of the second embodiment, the first alignment layer and the second alignment layer are the columnar alignment layer, wherein the normal direction of the plate-like molecule of the first alignment layer and the normal direction of the plate-like molecule of the second alignment layer are disposed substantially perpendicularly, and a reactive liquid crystal layer produced by fixing a reactive liquid crystal including a polymerizable liquid crystal material and showing the nematic phase on the counter surface of the first alignment layer or the second alignment layer is provided.

Such a liquid crystal display of the second embodiment will be explained hereinafter. FIG. 1B shows an example of the liquid crystal display of the second embodiment of the present invention. In the figure, the first alignment layer 3a and the second alignment layer 3b are the columnar alignment layer. In this embodiment, since the first alignment layer and the second alignment layer are the columnar alignment layer, the ferroelectric liquid crystal is aligned by a simple method without the need of the rubbing process or the photo alignment process.

Figure 3B:
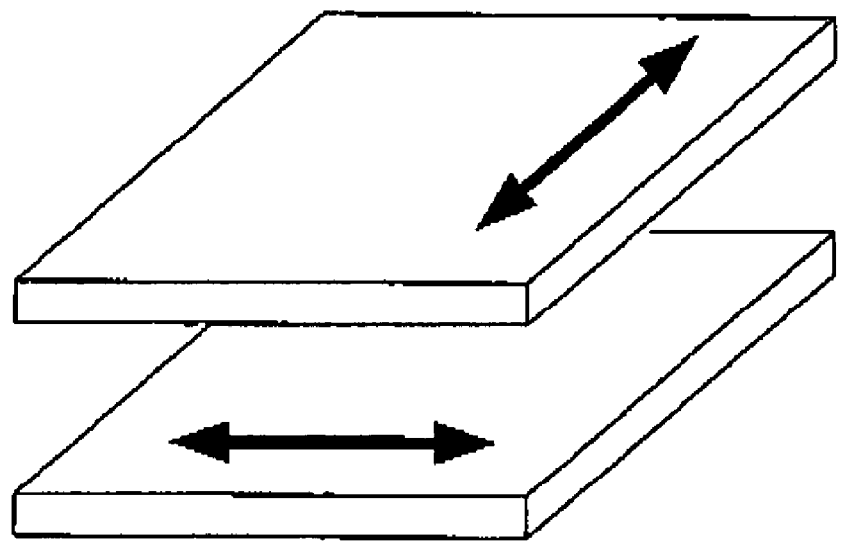

As shown in FIG. 3B, these alignment layers are disposed such that the normal direction of the plate-like molecule of the first alignment layer 3a and the normal direction of the plate-like molecule of the second alignment layer 3b are disposed substantially perpendicularly. The "substantially perpendicular" here denotes the angle θ formed by the normal direction of the plate-like molecule of the first alignment layer 3a and the normal direction of the plate-like molecule of the second alignment layer 3b is in a range of 90°±5°, and it is preferable that the angle θ is in a range of 90°±1°.

Furthermore, in this embodiment, a reactive liquid crystal layer 6 produced by fixing a reactive liquid crystal including a polymerizable liquid crystal material and showing the nematic phase is formed on the second alignment layer 3b. Since the reactive liquid crystal layer 6 is fixed on the second alignment layer 3b so that the anisotropy is provided to the reactive liquid crystal layer 6 by the second alignment layer 3b, it functions thereby as the alignment layer for aligning the ferroelectric liquid crystal. In this case, since the alignment direction of the first alignment layer and the second alignment layer with the normal direction of the plate-like molecule of the first alignment layer and the normal direction of the plate-like molecule of the second alignment layer disposed substantially perpendicularly can be changed to substantially parallel via the reactive liquid crystal layer, the alignment of the ferroelectric liquid crystal used for the liquid crystal layer can be controlled. Furthermore, since the reactive liquid crystal has a structure relatively similar to that of the ferroelectric liquid crystal, it has a strong interaction with the ferroelectric liquid crystal so that the alignment of the ferroelectric liquid crystal can be controlled effectively. Moreover, even in the case the constituent materials for the first alignment layer and the second alignment layer has the equivalent compositions, by providing the reactive liquid crystal layer on either of the alignment layers, the upper and lower layers with respect to the interposed ferroelectric liquid crystal can be different so that the interactions of each layer with respect to the ferroelectric liquid crystal are different. Thus, the ferroelectric liquid crystal can be aligned without formation of the alignment defects. Particularly in the case a ferroelectric liquid crystal showing the phase transition sequence without the smectic A phase (SmA) is used, since generation of the double domains can be restrained, the mono-domain alignment of the ferroelectric liquid crystal can be obtained thereby.

Although the reactive liquid crystal layer 6 is formed on the second alignment layer 3b in FIG. 1B, the reactive liquid crystal layer 6 may be formed on either of the first alignment layer 3a or the second alignment layer 3b in this embodiment, and thus it may be formed on the first alignment layer 3a.

Each constituent member and the manufacturing method of this embodiment will be explained hereinafter. The liquid crystal layer, the first substrate, the second substrate, the first electrode layer, the second electrode layer and the polarizing plate used in this embodiment are same as those explained in the column of the first embodiment. Moreover, since the manufacturing method of this embodiment can be carried out in the same manner as in the method described in the column of the first embodiment except that the reactive liquid crystal layer is provided on the first alignment layer or the second alignment layer, explanation thereof is omitted. Hereinafter, the first alignment layer, the second alignment layer and the reactive liquid crystal layer used in this embodiment will be explained.

a. First Alignment Layer and Second Alignment Layer

In this embodiment, the first alignment layer and the second alignment layer are the columnar alignment layer. Since the columnar alignment layer is same as that described for the first embodiment, explanation is omitted here. In this embodiment, the constituent materials of the first alignment layer and the second alignment layer may either be different or the same.

b. Reactive Liquid Crystal Layer

The reactive liquid crystal layer used in this embodiment is produced by fixing a reactive liquid crystal including a polymerizable liquid crystal material and showing the nematic phase. Such a reactive liquid crystal is aligned by the first alignment layer or the second alignment layer to be the base. For example, by polymerizing the reactive liquid crystal by the ultraviolet ray irradiation and fixing the alignment state, the reactive liquid crystal layer can be formed. Accordingly, in this embodiment, since the reactive liquid crystal layer is fixed on the first alignment layer or the second alignment layer so that the anisotropy is provided to the reactive liquid crystal layer by the first alignment layer or the second alignment layer, the reactive liquid crystal layer can function as an alignment layer for aligning the ferroelectric liquid crystal.

Moreover, since the reactive liquid crystal layer is fixed on the first alignment layer or the second alignment layer accordingly, even in the case the ferroelectric liquid crystal is heated to a temperature higher than the phase transition point, the alignment disturbance can hardly be generated so that the excellent alignment stability can be provided.

Furthermore, since the reactive liquid crystal used for the reactive liquid crystal layer has a structure relatively similar to that of the ferroelectric liquid crystal so that the interaction with respect to the ferroelectric liquid crystal is strong, it is advantageous in that the alignment of the ferroelectric liquid crystal can be controlled effectively.

(Reactive Liquid Crystal)

Hereinafter, the reactive liquid crystal used for such a reactive liquid crystal layer will be explained. The reactive liquid crystal used in this embodiment comprising the reactive liquid crystal layer by being fixed on either of the first alignment layer or the second alignment layer includes the polymerizable liquid crystal material and shows the nematic phase. Out of the liquid crystal phases, the nematic phase allows relatively easy alignment control, and thus by using the reactive liquid crystal showing the nematic phase, the anisotropy can easily be provided to the reactive liquid crystal layer by the first alignment layer or the second alignment layer to be the base. Moreover, since the reactive liquid crystal includes the polymerizable liquid crystal material, the alignment state of the reactive liquid crystal can easily be fixed.

As the polymerizable liquid crystal material, any of a polymerizable liquid crystal monomer, a polymerizable liquid crystal oligomer and a polymerizable liquid crystal polymer can be used. In the present embodiment, however, the polymerizable liquid crystal monomer can be used preferably. Compared to the other polymerizable liquid crystal materials, that is, a polymerizable liquid crystal oligomer and a polymerizable liquid crystal polymer, the polymerizable liquid crystal monomer can be aligned at a lower temperature and it has a high alignment sensitivity so that it can be aligned easily.

The above-mentioned polymerizable liquid crystal monomer is not particularly limited as long as it is a liquid crystal monomer having a polymerizable functional group. For example, a monoacrylate monomer, a diacrylate monomer, or the like can be presented. Moreover, these polymerizable liquid crystal monomers may be used alone or as a mixture of two or more kinds.

As the monoacrylate monomer, for example, the compounds represented by the below-mentioned formula can be presented:

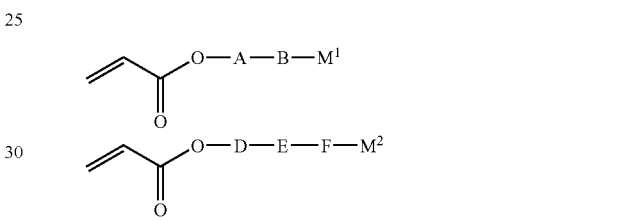

In the above-mentioned formula, A, B, D, E and F are a benzene, a cyclohexane or a pyrimidine, which may have a substituent group such as a halogen. Moreover, A and B, or D and E may be bonded via a bonding group such as an acetylene group, a methylene group and an ester group. $M^1$ and $M^2$ may be any of a hydrogen atom, an alkyl group having 3 to 9 carbon atoms, an alkoxy carbonyl group having 3 to 9 carbon atoms, or a cyano group. Furthermore, an acryloyloxy group on the molecular chain end and A or D may be bonded via a spacer such as an alkylene group having 3 to 6 carbon atoms.

Moreover, as the diacrylate monomer, for example, the compounds represented by the below-mentioned formula can be presented

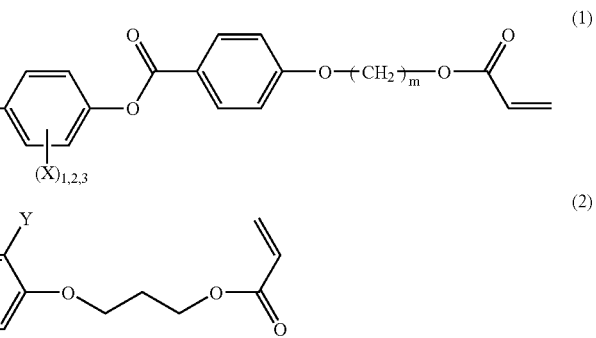

Here, X and Y in the above formula is a hydrogen, an alkyl having 1 to 20 carbon atoms, an alkenyl having 1 to 20 carbon atoms, an alkyloxy having 1 to 20 carbon atoms, an alkyloxycarbonyl having 1 to 20 carbon atoms, a formyl, an alkyl carbonyl having 1 to 20 carbon atoms, an alkyl carbonyloxy having 1 to 20 carbon atoms, a halogen, a cyano or a nitro. m is an integer in a range of 2 to 20. X is preferably an alkyloxy carbonyl having 1 to 20 carbon atoms, a methyl or a chlorine. In particular, it is preferably an alkyloxy carbonyl having 1 to 20 carbon atoms, and particularly preferably $CH_3(CH_2)_4OCO$.

Furthermore, as the diacrylate monomer, for example, the compounds represented by the below-mentioned formula can also be presented:

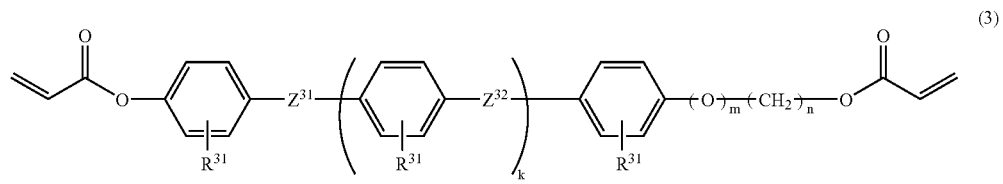

(3)

Here, $Z^{31}$ and $Z^{32}$ in the above formula are each independently directly bonded —COO—, —OCO—, —O—, —$CH_2CH_2$—, —CH=CH—, —C≡C—, —$OCH_2$—, —$CH_2O$—, —$CH_2CH_2COO$— or —$OCOCH_2CH_2$—, $R^{31}$s are a hydrogen or an alkyl having 1 to 5 carbon atoms. k and m is 0 or 1, and n is an integer in a range of 2 to 8.

Furthermore, as a specific example of the compound represented by the above formula (3), the compounds shown in below-mentioned formula can be cited:

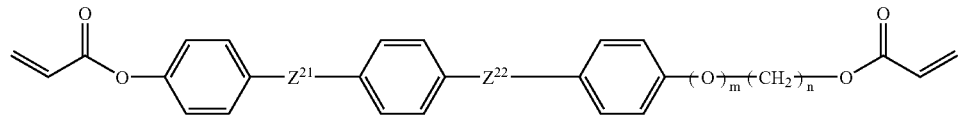

Here, $Z^{21}$ and $Z^{22}$ in the formula are each independently directly bonded —COO—, —OCO—, —O—, —$CH_2CH_2$—, —CH=CH—, —C≡C—, —$OCH_2$—, —$CH_2O$—, —$CH_2CH_2COO$— or —$OCOCH_2CH_2$—. m is 0 or 1, and n is an integer in a range of 2 to 8.

In the present embodiment, in particular, the compounds represented by the above-mentioned formulae (1) or (3) can be used preferably. As the reactive liquid crystal containing a compound represented by the formula (3), for example, "ADEKA CHIRACOL PLC-7183", "ADEKACHIRACOL PLC-7209" produced by ASAHI DENKA CO., LTD. or the like can be presented. Moreover, as the reactive liquid crystal containing an acrylate monomer, for example, "ROF-5101", "ROF-5102" produced by the Rolic Technologies Ltd., or the like can be presented.

The polymerizable liquid crystal monomer used in the present embodiment is preferably a diacrylate monomer among the above-mentioned examples. According to the diacrylate monomer, polymerization can be carried out easily while preferably maintaining the aligned state.

The above-mentioned polymerizable liquid crystal monomer may not show the nematic phase by itself. In the embodiment, these polymerizable liquid crystal monomers may be used as a mixture of two or more kinds as mentioned above so that a composition mixture thereof, that is, a reactive liquid crystal may show the nematic phase.

Furthermore, according to the present invention, as needed, a photo polymerization initiating agent or a polymerization inhibiting agent may be added to the above-mentioned reactive liquid crystal. For example, at the time of polymerizing a polymerizable liquid crystal material by the electron beam irradiation, the photo polymerization initiating agent may not be needed, however, in the case of the polymerization used commonly by for example, the ultraviolet ray irradiation, in general a photo polymerization initiating agent is used for the promoting the polymerization.

As the photo polymerization initiating agent to be used in the present embodiment, a benzyl (it is also referred to as a bibenzoyl), a benzoin isobutyl ether, a benzoin isopropyl ether, a benzophenone, a benzoyl benzoic acid, a methyl benzoyl benzoate, a 4-benzoyl-4'-methyl diphenyl sulfide, a benzyl methyl ketal, a dimethyl amino methyl benzoate, a 2-n-butoxy ethyl-4-dimethyl amino benzoate, a p-dimethyl amino isoamyl benzoate, a 3,3'-dimethyl-4-methoxy benzophenone, a methylobenzoyl formate, a 2-methyl-1-(4-(methyl thio) phenyl)-2-morpholino propane-1-on, a 2-benzyl-2-dimethyl amino-1-(4-morpholino phenyl)-butane-1-on, a 1-(4-dodecylphenyl)-2-hydroxy-2-methyl propane-1-on, a 1-hydroxy cyclohexyl phenyl ketone, a 2-hydroxy-2-methyl-1-phenyl propane-1-on, a 1-(4-isopropyl phenyl)-2-hydroxy-2-methyl propane-1-on, a 2-chloro thioxantone, a 2,4-diethyl thioxantone, a 2,4-diisopropyl thioxantone, a 2,4-dimethyl thioxantone, an isopropyl thioxantone, a 1-chloro-4-propoxy thioxantone, or the like can be presented. In addition to the photopolymerization initiating agent, a sensitizing agent may be added within a range of not deteriorating the object of the embodiment.

The addition amount of such a photo polymerization initiating agent is in general 0.01 to 20% by weight, it is preferably 0.1 to 10% by weight, and more preferably in a range of 0.5 to 5% by weight so as to be added to the above-mentioned reactive liquid crystal.

(Reactive Liquid Crystal Layer)

The thickness of the reactive liquid crystal layer produced by fixing the reactive liquid crystal as mentioned above is preferably in a range of 1 to 1,000 nm, and it is more preferably in a range of 3 to 100 nm. In the case the reactive liquid crystal layer is thicker than the above-mentioned range, the anisotropy is generated excessively, and in the case it is thinner than the above-mentioned range, the predetermined anisotropy may not be obtained. Therefore, the thickness of the reactive liquid crystal layer may be determined based on the needed anisotropy.

Next, the method for forming the reactive liquid crystal layer will be explained. The reactive liquid crystal layer can be formed by coating a reactive liquid crystal layer forming coating solution including the above-mentioned reactive liquid crystal onto the first alignment layer or the second alignment layer and applying the alignment process so as to fix the aligned state of the above-mentioned reactive liquid crystal.

Moreover, a method of preliminarily forming a dry film, or the like and laminating the same onto the first alignment layer or the second alignment layer can also be used instead of coating the reactive liquid crystal layer forming coating solution. In the present embodiment, however, it is preferable to use the method of preparing a reactive liquid crystal forming coating solution by dissolving a reactive liquid crystal in a solvent, coating the same on the first alignment layer or the second alignment layer and removing the solvent because this is a method relatively simple in terms of the process.

The solvent used for the above-mentioned reactive liquid crystal layer forming coating solution is not particularly limited as long as it can dissolve the above-mentioned reactive liquid crystal, or the like without inhibiting the alignment ability of the columnar alignment layer. For example, one kind or two or more kinds of hydrocarbons such as a benzene, a toluene, a xylene, an n-butyl benzene, a diethyl benzene and a tetralin; ethers such as a methoxy benzene, a 1,2-dimethoxy benzene and a diethylene glycol dimethyl ether; ketones such as an acetone, a methyl ethyl ketone, a methyl isobutyl ketone, a cyclohexanone and a 2,4-pentane dion; esters such as an ethyl acetate, a propylene glycol monomethyl ether acetate, a propylene glycol monoethyl ether acetate and a γ-butyrolactone; amide based solvents such as a 2-pyrolidone, an N-methyl-2-pyrolidone, a dimethyl formamide and a dimethyl acetamide; halogen based solvents such as a chloroform, a dichloromethane, a carbon tetrachloride, a dichloroethane, a tetrachloroethane, a tritrichloroethylene, a tetrachloroethylene, a chlorobenzene, and an orthodichlorobenzene; alcohols such as a t-butyl alcohol, a diacetone alcohol, a glycerol, a monoacetin, an ethylene glycol, a triethylene glycol and a hexylene glycol; phenols such as a phenol and a parachloro phenol; cellosolves such as a methyl cellosolve, an ethyl cellosolve, a butyl cellosolve and an ethylene glycol monomethyl ether acetate can be used.

Moreover, by using only one kind of a solvent, the solubility of the above-mentioned reactive liquid crystal, or the like may be insufficient or the columnar alignment layer may be corroded as mentioned above. However, by using two or more kinds of the solvents as a mixture, the trouble can be avoided. Among the above-mentioned solvents, those preferable as a single solvent are the hydrocarbons and the glycol monoether acetate based solvents, and those preferable as a solvent mixture are a mixture of the ethers or the ketones and the glycol based solvents. Since the concentration of the reactive liquid crystal layer forming coating solution depends on the solubility of the reactive liquid crystal and the thickness of the reactive liquid crystal layer to be formed, it cannot be defined on the whole, however, it is prepared in general in a range of 1 to 60% by weight, and preferably in a range of 3 to 40% by weight.

Furthermore, to the above-mentioned reactive liquid crystal layer forming coating solution, the compounds as mentioned below can be added within a range of not deteriorating the purpose of the present embodiment. As the compounds to be added, for example, polyester (meth)acrylates obtained by reacting a polyester prepolymer obtained by the condensation of a polyhydric alcohol and a monobasic acid or a polybasic acid with a (meth) acrylic acid; polyurethane (meth) acrylates obtained by reacting a polyol group and a compound having two isocyanate groups with each other, and reacting the reaction product with a (meth) acrylic acid; photo polymerizable compounds such as an epoxy(meth)acrylate, obtained by reacting epoxy resins such as a bisphenol A type epoxy resin, a bisphenol F type epoxy resin, a novolak type epoxy resin, a polycarboxylic acid polyglycidyl ester, a polyol polyglycidyl ether, an aliphatic or alicyclic epoxy resin, an amine epoxy resin, a triphenol methane type epoxy resin and a dihydroxy benzene type epoxy resin with a (meth)acrylic acid; photo polymerizable liquid crystal compounds having an acrylic group or a methacrylic group, or the like can be presented. The addition amount of these compounds to the above-mentioned reactive liquid crystal can be selected within a range of not deteriorating the purpose of the embodiment. By adding these compounds, the hardening property of the reactive liquid crystal can be improved so that the mechanical strength of the reactive liquid crystal layer to be obtained can be increased and furthermore, the stability thereof can be improved.

As a method for coating such a reactive liquid crystal layer forming coating solution, a spin coating method, a roll coating method, a printing method, a dip coating method, a curtain coating method (die coating method), a casting method, a bar coating method, a blade coating method, a spray coating method, a gravure coating method, a reverse coating method, a extruding coating method, or the like can be presented.

Moreover, after coating the above-mentioned reactive liquid crystal layer forming coating solution, the solvent is removed. The solvent removal can be carried out, for example, by the reduced pressure removal or the heating removal, or furthermore, a method as a combination thereof, or the like.

According to the embodiment, as mentioned above, the coated reactive liquid crystal is aligned by the columnar alignment layer so as to be in a state having the liquid crystal regularity. That is, the reactive liquid crystal comes to have the nematic phase. This is carried out in general by a method of the heat treatment to the N-I transition point or lower, or the like. Here, the "N-I transition point" denotes the temperature of the transition from the liquid crystal phase to the isotropic phase.

As mentioned above, the reactive liquid crystal used in the present invention has a polymerizable liquid crystal material. In order to fix the aligned state of such a polymerizable liquid crystal material, a method of directing an activating radiation for activating the polymerization is used. The "activating radiation" here is the radiation having the ability of inducing the polymerization to the polymerizable liquid crystal material. As needed, a photopolymerization initiating agent may be included in the polymerizable liquid crystal material.

The activating radiation is not particularly limited as long as it is a radiation capable of polymerizing the polymerizable liquid crystal material. In general, from the viewpoint of the device easiness, or the like, an ultraviolet ray or a visible light beam is used. An irradiation beam having a wavelength of 150 to 500 nm, preferably 250 to 450 nm, further preferably 300 to 400 nm is used.

According to the present embodiment, a method of directing an ultraviolet ray as the activating radiation to a polymerizable liquid crystal material to have the radical polymerization by generating a radical by the photo polymerization initiating agent with an ultraviolet ray is a preferable method. Since the method of using an ultraviolet ray as the activating radiation is a technique already established, it can be applied easily to the embodiment including the photo polymerization initiating agent to be used.

As the light source of the irradiating light beam, a low pressure mercury lamp (a germicidal lamp, a fluorescent chemical lamp, a black light), a high pressure discharge lamp (a high pressure mercury lamp, a metal halide lamp), a short arc discharge lamp (an ultra high pressure mercury lamp, a xenon lamp, a mercury xenon lamp), or the like can be presented as the examples. In particular, use of a metal halide lamp, a xenon lamp, a high pressure mercury lamp, or the like can be recommended. Moreover, the irradiation strength is adjusted optionally according to the composition of the reactive liquid crystal and the amount of the photo polymerization initiating agent.

The irradiation of such an activating radiation can be carried out by the temperature condition to have the above-mentioned polymerizable liquid crystal material in a liquid crystal phase, or at a temperature lower than the temperature to have the liquid crystal phase. The polymerizable liquid crystal material once had the liquid crystal phase would not have the sudden disturbance of the aligned state even in the case the temperature is lowered thereafter.

As a method for fixing the aligned state of the polymerizable liquid crystal material, in addition to the above-mentioned method of directing the activating radiation, a method of polymerizing the polymerizable liquid crystal material by heating can be used as well.

3. Third Embodiment

Next, the third embodiment of the liquid crystal display of the present invention will be explained. The liquid crystal display of the third embodiment comprises the first alignment layer as the columnar alignment layer and the second alignment layer as the photo alignment layer.

Such a liquid crystal display of the third embodiment will be explained hereafter. FIG. 1A shows an example of the liquid crystal display of the third embodiment of the present invention. In the figure, the first alignment layer 3a is the columnar alignment layer, and the second alignment layer 3b is the photo alignment layer. As shown in FIG. 3A, since the normal direction of the plate-like molecule of the first alignment layer 3a and the alignment direction of the second alignment layer 3b are provided substantially parallel, the mono domain alignment of the ferroelectric liquid crystal can be obtained with a simple alignment process without generation of the alignment defects. The definition of "substantially parallel" is same as the explanation given in the first embodiment.

Hereinafter, each constituent member and the manufacturing method of this embodiment will be explained. The first alignment layer used in this embodiment is the columnar alignment layer, and since the columnar alignment layer is same as that described in the item of the first embodiment, explanation is omitted here. Moreover, the liquid crystal layer, the first substrate, the second substrate, the first electrode layer, the second electrode layer and the polarizing plate used in this embodiment are same as those explained in the column of the first embodiment. Furthermore, since the manufacturing method of this embodiment can be carried out in the same manner as in the method described in the column of the first embodiment except that the second alignment layer is provided as a rubbing alignment layer or a photo alignment layer, explanation thereof is omitted. Hereinafter, the second alignment layer used in this embodiment will be explained.

a. Second Alignment Layer

The second alignment layer used in this embodiment has the function of controlling the alignment of the ferroelectric liquid crystal by interposing the ferroelectric liquid crystal with respect to the first alignment layer. In this embodiment, the second alignment layer is a photo alignment layer.

The photo alignment layer used in this embodiment is not particularly limited as long as it is one commonly used for the liquid crystal display. It has the liquid crystal molecule on the film aligned by providing the anisotropy to a film obtained by directing a light beam with the polarization controlled to a substrate coated with the constituent materials of the photo alignment layer to be described later so as to generate the photo-excited reaction (decomposition, isomerization, dimerization).

The constituent material for such a photo alignment layer used in the embodiment is not particularly limited as long as it has the effect of aligning the ferroelectric liquid crystal by generating the photo-excited reaction by directing a light beam (photo aligning). Such materials can be roughly classified into the photoreactive materials for providing the anisotropy to the photo alignment layer by generating the photoreaction and the photo isomerizable materials for providing the anisotropy to the photo alignment layer by generating the photo isomerization reaction. The wavelength range of light which causes photo-excited reaction in the constituent materials of the photo alignment layer is preferably within the wavelength range of ultraviolet rays, that is, the range of 10 nm to 400 nm, more preferably within the range of 250 nm to 380 nm. Hereinafter, each of them will be explained.

(Photoreaction Type)

First, the photoreaction type material will be explained. As mentioned above, the photoreaction type material is a material for providing the anisotropy to the photo alignment layer by generating the photoreaction. The photoreaction type material used in the present embodiment is not particularly limited as long as it is a material having such characteristics. It is more preferably a material for providing the anisotropy to the photo alignment layer by generating the photo dimerization reaction or the photo decomposition reaction.

The photo dimerization reaction mentioned here is a reaction that two molecules are polymerized by radical polymerization of their reactive sites aligned in the direction of polarization through the irradiation with light. This reaction makes it possible to stabilize the alignment in the polarization direction to give anisotropy to the photo alignment layer. On the other hand, the photo decomposition reaction is a reaction which decomposes a molecule chain of polyimide or the like which is aligned in the direction of polarization by the irradiation with light. This reaction makes it possible to give anisotropy to the photo alignment layer in the state that the molecule chain aligned in the direction perpendicular to the polarization direction remains. Among these photoreaction type materials, it is more preferable to use a material capable of providing the anisotropy to the photo alignment layer by the photo dimerization reaction in this embodiment owing to the high exposure sensitivity and the wide material selection range.

The photoreactive material using such photo dimerization reaction is not limited to any especial kind if the material can give anisotropy to the photo alignment layer by photo dimerization reaction. The material preferably comprises an photo dimerization-reactive compound having a radical-polymerizable functional group and dichroism that different absorptivities are exhibited in accordance with the polarization direction thereof since the alignment of the photo dimerization-reactive compound is stabilized and anisotropy can easily be given to the photo alignment layer by radical-polymerizing its reactive sites aligned in the polarization direction.

Examples of the photo dimerization-reactive compound include dimerization-reactive polymers each having, as its side chain, at least one reactive site selected from cinnamic acid ester, coumalin, quinoline, and a chalcone group.

Of these, the following is preferred as the photo dimerization-reactive compound having such properties; a dimerization-reactive polymer having, as its side chain, any one of cinnamic acid ester, coumalin and quinoline. This is because the compound is radical-polymerized in the state that the double bonds in the α,β-unsaturated ketone aligned in the polarization direction function as reactive sites, whereby anisotropy can easily be given to the photo alignment layer.

The main chain of the dimerization-reactive polymer is hot limited to any especial kind if the main chain is a chain that is generally known as a polymer main chain, and is preferably a chain which does not have a substituent containing many π electrons, which hinder interactions between the reactive sites of the above-mentioned side chain, an example of the substituent being an aromatic hydrocarbon group.

The weight-average molecular weight of the dimerization-reactive polymer is not especially limited, and is preferably from 5,000 to 40,000, more preferably from 10,000 to 20,000. The weight-average molecular weight can be measured by gel permeation chromatography (GPC). If the weight-average molecular weight of the dimerization-reactive polymer is too small, an appropriate anisotropy may not be given to the photo alignment layer. Conversely, if it is too large, the viscosity of the coating solution at the time of the formation of the photo alignment layer is so high that a homogeneous coat layer may not easily be formed.

As the dimerization-reactive polymer, a compound represented by the following formula can be illustrated:

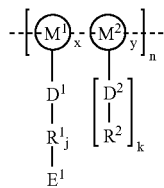

In the above formula, $M^1$ and $M^2$ each independently represent a monomer unit of a homopolymer or a copolymer. Examples thereof include ethylene, acrylate, methacrylate, 2-chloroacrylate, acrylamide, methacrylamide, 2-chloroacrylamide, styrene derivatives, maleic acid derivatives, and siloxane. $M^2$ may be acrylonitrile, methacrylonitrile, methacrylate, methyl methacrylate, hydroxyalkyl acrylate or hydroxyalkyl methacrylate. x and y each represent the mole ratio of each of the monomer units when the units are polymerized into a copolymer, and are each a number satisfying: $0 < x \leq 1$, $0 \leq y < 1$, and $x+y=1$. n represents an integer of 4 to 30,000. $D^1$ and $D^2$ each represent a spacer unit.

$R^1$ is a group represented by $-A-(Z^1-B)_x-Z^2-$, and $R^2$ is a group represented by $-A-(Z^1-B)_z-Z^3$, wherein A and B each independently represent a covalent single bond, pyridine-2,5-diyl, pyrimidine-2,5-diyl, 1,4-cyclohexylene, 1,3-dioxane-2,5-diyl, or 1,4-phenylene which may have a substituent; $Z^1$ and $Z^2$ each independently represent a covalent single bond, $-CH_2-CH_2-$, $-CH_2O-$, $-OCH_2-$, $-CONR-$, $-RNCO-$, $-COO-$ or $-OOC-$, wherein R is a hydrogen atom or a lower alkyl group; $Z^3$ is a hydrogen atom, an alkyl or alkoxy which has 1 to 12 carbon atoms and may have a substituent, cyano, nitro or halogen; z is an integer of 0 to 4; $E^1$ represents an photo dimerization-reactive site, examples of which include cinnamic acid ester, coumalin, quinoline, and a chalcone group; and j and k are each independently 0 or 1.

More preferable examples of this dimerization-reactive polymer include compounds represented by the following formulae;

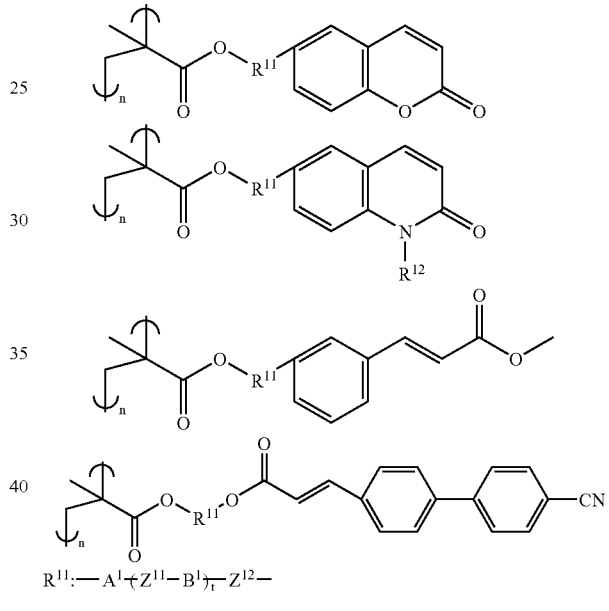

$R^{11}$: $-A^1-(Z^{11}-B^1)_t-Z^{12}-$ wherein $A^1$ and $B^1$: 1,4-phenylene, a covalent single bond, pyridine-2,5-diyl, pyrimidine-2,5-diyl, 1,4-cyclohexylene or 1,3-dioxane-2,5-diyl;

$Z^{11}$ and $Z^{12}$: $-CH_2-CH_2-$, $-COO-$, $-OOC-$, or a covalent single bond; and t: an integer of 0 to 4.

$R^{12}$: a lower alkyl n: an integer of 4 to 30,000

Of the above-mentioned dimerization-reactive polymers, particularly preferable is at least one of compounds 1 to 4 represented by the following formulae:

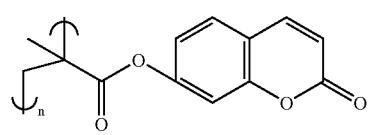

1

-continued

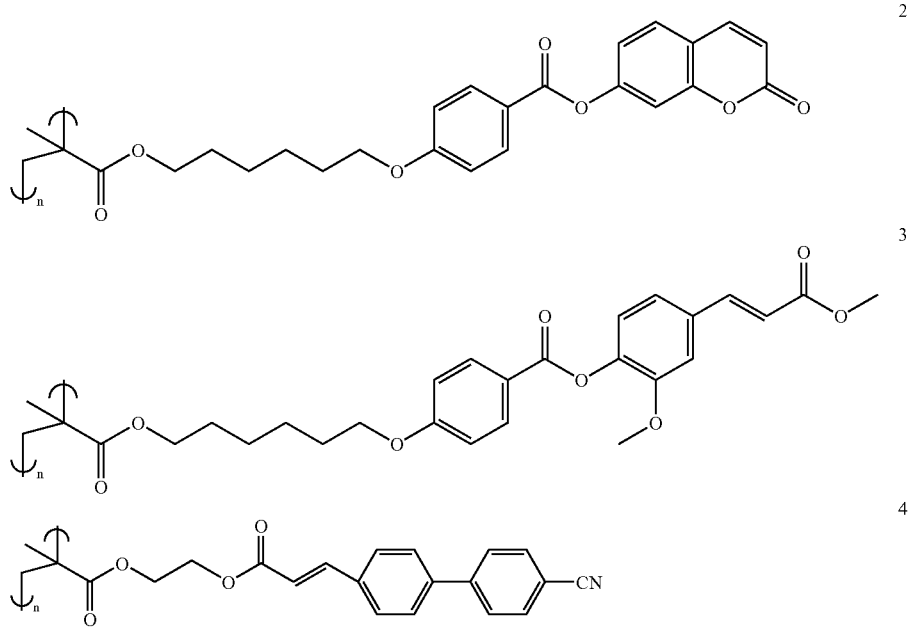

In the present embodiment, a photo dimerization-reactive site or substituent can be variously selected as the photo dimerization-reactive compound from the above-mentioned compounds in accordance with required properties. One kind of the photo dimerization-reactive compound may be used alone or a combination of two or more kinds can be used.

The photoreactive material using photo dimerization reaction may contain additives besides the above-mentioned photo dimerization-reactive compound as long as the photo-aligning of the photo alignment layer is not hindered. Examples of the additives include a polymerization initiator and a polymerization inhibitor.

It is advisable to select the polymerization initiator or the polymerization inhibitor appropriately from generally-known compounds in accordance with the kind of the photo dimerization-reactive compound and then use the selected one. The added amount of the polymerization initiator or the polymerization inhibitor is preferably from 0.001% by weight to 20% by weight, more preferably from 0.1% by weight to 5% by weight of the photo dimerization-reactive compound.

Examples of the photoreactive material using the photo decomposition reaction include a polyimide "RN1199" manufactured by NISSAN CHEMICAL INDUSTRIES, LTD. Moreover, as the photoreaction type material utilizing the photo dimerization reaction, for example, "ROP102" or "ROP103" produced by the Rolic Technologies Ltd., or the like can be presented.

Next, the photo alignment processing method in the case of using the photoreactive material will be explained. In this embodiment, the photo alignment processing method is not particularly limited as long as the anisotropy can be provided to the photo alignment layer. For example, it can be carried out by coating a coating solution prepared by diluting the constituent materials for the photo alignment layer in an organic solvent onto the surface facing a liquid crystal layer of a substrate provided with an electrode layer and drying. In this case, the content of the photo dimerization-reactive compound in the coating solution is preferably from 0.05% by weight to 20% by weight, more preferably from 0.2% by weight to 2% by weight. If the content of photo dimerization-reactive compound is too small, an appropriate anisotropy is not easily given to the photo alignment layer. Conversely, if the content is too large, the viscosity of the coating solution becomes so high that a homogeneous coat layer is not easily formed.

The coating method which can be used is spin coating, roll coating, rod bar coating, spray coating, air knife coating, slot die coating, wire bar coating or the like.

The thickness of the polymer film obtained by the coating with the constituent material is preferably from 1 nm to 200 nm, more preferably from 3 nm to 100 nm. If the thickness of the polymer film is too small, a sufficient photoaligning may not be obtained. Conversely, if the thickness is too large, the alignment of the liquid crystal molecules may be disturbed and further costs therefor are not preferred.

The obtained polymer film causes photo-excited reaction by the irradiation with light the polarization of which is controlled, whereby anisotropy can be given. The wavelength range of the radiated light should be appropriately selected in accordance with the constituent material of the used photo alignment layer, and is preferably the range of ultraviolet ray wavelengths, that is, the range of 100 nm to 400 nm, more preferably the range of 250 nm to 380 nm.

The polarizing direction is not particularly limited as long as the photo-excited reaction can be generated, and it is preferably substantially perpendicular to the substrate surface because the alignment state of the ferroelectric liquid crystal can be provided preferably.

(Photo Isomerization Type)

Next, the photo isomerization type material will be explained. In the present embodiment, the "photo isomerization type material" is a material for providing the anisotropy to the photo alignment layer by generating the photo isomerization reaction as mentioned above, and it is not particularly limited as long as it is a material having the characteristics. It is more preferably one containing a photo isomerization-reactive compound for providing the anisotropy to the photo alignment layer by generating the photo isomerization reaction. Since such a photo isomerization-reactive compound is included, the stable isomers are increased out of a plurality of isomers, and thereby the anisotropy can be provided to the photo alignment layer.

Such photo isomerization-reactive compound is not limited to any especial kind if the compound is a material having the above-mentioned properties, and is preferably a compound which has dichroism that different absorptivities are exhibited in accordance with the polarization direction thereof and generates photo isomerization reaction by the irradiation with light. By generating the isomerization of the reactive site aligned in the polarization direction of the photo isomerization-reactive compound having such properties, anisotropy can easily be given to the photo alignment layer.

For the photo isomerization reaction generating such photo isomerization-reactive compound, the photo isomerization reaction is preferably the cis-trans isomerization reaction since any one of the cis-isomer and the trans-isomer increases by the irradiation with light, whereby anisotropy can be given to the photo alignment layer.

Examples of such photo isomerization-reactive compound may be monomolecular compounds or polymerizable monomers polymerizable with light or heat. These should be appropriately selected in accordance with the kind of the used ferroelectric liquid crystal. It is preferable to use any one of the polymerizable monomers since the monomer gives anisotropy to the photo alignment layer by the irradiation with light and subsequently the monomer is polymerized, whereby the anisotropy can be made stable. Of such polymerizable monomers, preferable is an acrylate monomer or methacrylate monomer since the monomer gives anisotropy to the photo alignment layer and subsequently the monomer can easily be polymerized in the state that the anisotropy is kept good.

The polymerizable monomer may be a monofunctional monomer or a polyfunctional monomer. A bifunctional monomer is preferable since the anisotropy of the photo alignment layer, based on the polymerization, becomes more stable.

Specific examples of such a photo isomerization-reactive compound include compounds having a cis-trans isomerization-reactive skeleton, such as an azobenzene skeleton or a stilbene skeleton.

In this case, the number of the cis-trans isomerization-reactive skeleton(s) may be one or more, and is preferably two since the alignment of the ferroelectric liquid crystal is easily controlled.

The cis-trans isomerization-reactive skeleton(s) may have a substituent in order to make interaction with the liquid crystal molecules higher. The substituent is not limited to any special kind if the substituent can make the interaction with the liquid crystal molecules high and further does not hinder the alignment of the cis-trans isomerization-reactive skeleton(s). Examples include a carboxyl group, a sodium sulfonate group, and a hydroxyl group. These skeleton structures can be appropriately selected in accordance with the kind of the used ferroelectric liquid crystal.

The photo isomerization-reactive compound may have a group containing many π electrons in the molecule, such as an aromatic hydrocarbon group, besides the cis-trans isomerization-reactive skeleton in order to make the interaction with the liquid crystal molecules higher. The cis-trans isomerization-reactive skeleton and the aromatic hydrocarbon group may be bonded to each other through a bonding group. The bonding group is not limited to any especial kind if the group can make the interaction with the liquid crystal molecules high. Examples include —COO—, —OCO—, —O—, —C≡C—, —CH$_2$—CH$_2$—, —CH$_2$O—, and —OCH$_2$—.

In the case of using a polymerizable monomer as the photo isomerization-reactive compound, it is preferable that the monomer has, as its side chain, the above-mentioned cis-trans isomerization-reactive skeleton. When the monomer has, as its side chain, the cis-trans isomerization-reactive skeleton, the advantageous effect of the anisotropy given to the photo alignment layer becomes larger and this compound becomes particularly suitable for the control of the alignment of the ferroelectric liquid crystal. In this case, it is preferable that the above-mentioned aromatic hydrocarbon group and the bonding group contained in the molecule are contained, together with the cis-trans isomerization-reactive skeleton, in the side chain so as to make the interaction with the liquid crystal molecules high.

The side chain of the polymerizable monomer may have, as a spacer, an aliphatic hydrocarbon group such as an alkylene group so that the cis-trans isomerization-reactive skeleton can easily be aligned.

Of the above-mentioned photo isomerization-reactive compounds of monomolecular compounds and polymerizable monomers as described above, any compound having in the molecule thereof an azobenzene skeleton is preferable as the photo isomerization-reactive compound used in the present embodiment. This is because the azobenzene skeleton interacts highly with the liquid crystal molecules and is particularly suitable for the control of the alignment of the ferroelectric liquid crystal since the skeleton contains many π electrons.

Hereinafter, the reason why the anisotropy can be provided to the photo alignment layer by generating the photo isomerization reaction of the azobenzene skeleton will be explained. First, in the case a linear polarization ultraviolet ray is directed to the azobenzene skeleton, the azobenzene skeleton of the trans isomer, with the molecule longer axis aligned in the polarization direction is changed to a cis isomer as shown by the below-mentioned formula,

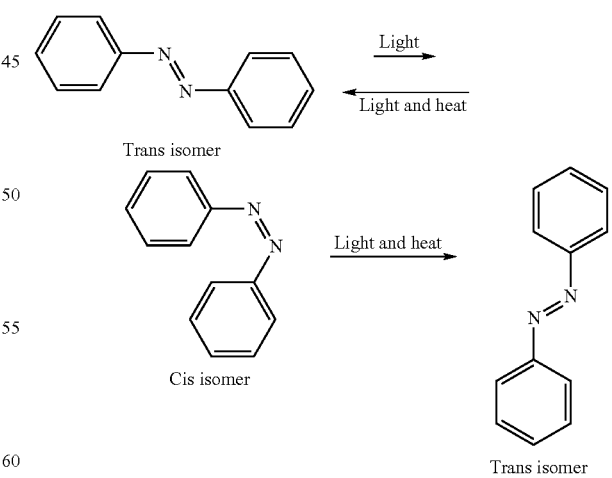

Since the cis isomer of the azobenzene skeleton is more chemically unstable than trans isomers thereof, the cis isomer returns thermally to any one of the trans isomers or absorbs visible rays to returns thereto. At this time, it happens with the same possibility whether the cis isomer turns to the trans isomer at the left side or the trans isomer at the right side in the formula. Accordingly, when the azobenzene skeleton continues to absorb ultraviolet rays, the ratio of the trans isomer at the right side increases so that the average alignment direction of the azobenzene skeleton becomes perpendicular to the polarized ultraviolet ray direction. In the present embodiment, this phenomenon is used to make polarization directions of skeletons of azobenzene consistent with each other, thereby giving anisotropy to the photo alignment layer to control the alignment of liquid crystal molecules on the layer.

An example of such monomolecular compound out of the compounds each having in the molecule an azobenzene skeleton used may be a compound represented by the following formula:

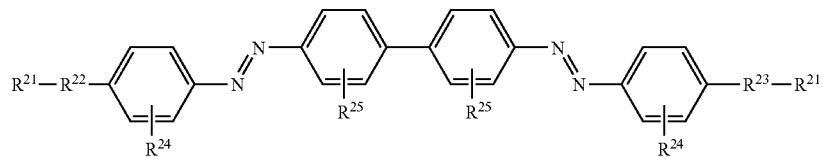

wherein $R^{21}$s each independently represent a hydroxy group; $R^{22}$ represents a linking group represented by $-(A^{21}\text{-}B^{21}\text{-}A^{21})_m\text{-}(D^{21})_n\text{-}$ and $R^{23}$ represents a linking group represented by $(D^{21})_n\text{-}(A^{21}\text{-}B^{21}\text{-}A^{21})_n\text{-}$, wherein $A^{21}$ represents a bivalent hydrocarbon group, $B^{21}$ represents —O—, —COO—, —OCO—, —CONH—, —NHCO—, —NHCOO— or —OCONH—, m represents an integer of 0 to 3, $D^{21}$ represents a bivalent hydrocarbon group when m is 0 and represents —O—, —COO—, —OCO—, —CONH—, —NHCO—, —NHCOO— or —OCONH—when m is an integer of 1 to 3, and n represents 0 or 1; $R^{24}$s each independently represent a halogen atom, a carboxy group, a halogenated methyl group, a halogenated methoxy group, a cyano group, a nitro group, a methoxy group, or a methoxycarbonyl group provided that the carboxy group may be combined with an alkali metal to form a salt; and $R^{25}$ s each independently represent a carboxy group, a sulfo group, a nitro group, an amino group or a hydroxy group provided that the carboxy group or the sulfo group may be combined with an alkali metal to form a salt.

Specific examples of the compound represented by the above-mentioned formula include the following compounds:

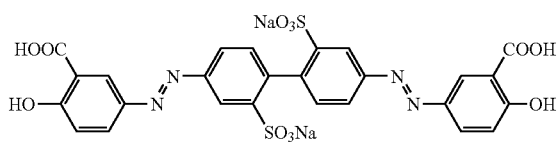

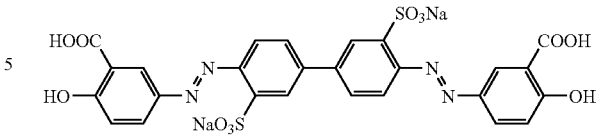

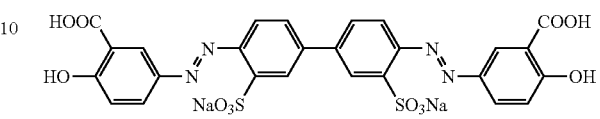

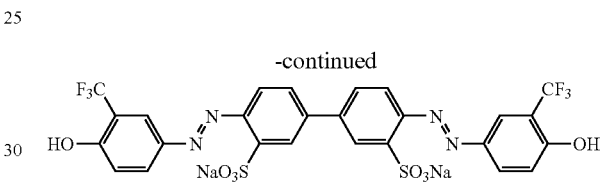

An example of the polymerizable monomer having in its side chain the azobenzene skeleton may be a compound represented by the following formula:

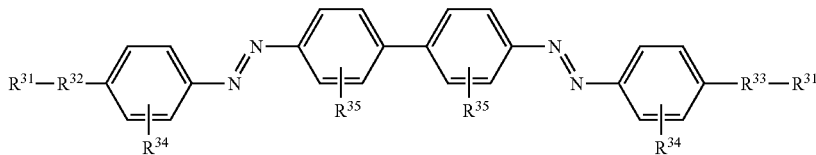

In the above formula, $R^{31}$s each independently represent a (meth)acryloyloxy group, a (meth)acrylamide group, a vinyloxy group, a vinyloxycarbonyl group, a vinyliminocarbonyl group, a vinyliminocarbonyloxy group, a vinyl group, an isopropenyloxy group, an isopropenyloxycarbonyl group, an isopropenyliminocarbonyl group, an isopropenyliminocarbonyloxy group, an isopropenyl group or an epoxy group; $R^{32}$ represents a linking group represented by $-(A^{31}\text{-}B^{31}\text{-}A^{31})_n\text{-}(D^{31})_n\text{-}$ and $R^{33}$ represents a linking group represented by $(D^{31})_n\text{-}(A^{31}\text{-}B^{31}\text{-}A^{31})_n\text{-}$ wherein $A^{31}$ represents a bivalent hydrocarbon group, $B^{31}$ represents —O—, —COO—, —OCO—, —CONH—, —NHCO—, —NHCOO— or —OCONH—, m represents an integer of 0 to 3, $D^{31}$ represents a bivalent hydrocarbon group when m is 0 and represents —O—, —COO—, —OCO—, —CONH—, —NHCO—, —NHCOO— or —OCONH— when m is an integer of 1 to 3, and n represents 0 or 1; $R^{34}$s each independently represent a halogen atom, a carboxy group, a halogenated methyl group, a halogenated methoxy group, a cyano group, a nitro group, a methoxy group, or a methoxycarbonyl group provided that the carboxy group may be combined with an alkali metal to form a salt; and $R^{35}$s each independently represent a carboxy group, a sulfo group, a nitro group, an amino group or a hydroxy group provided that the carboxy group or the sulfo group may be combined with an alkali metal to form a salt.

A specific example of the compound represented by the above-mentioned formula is the following compound:

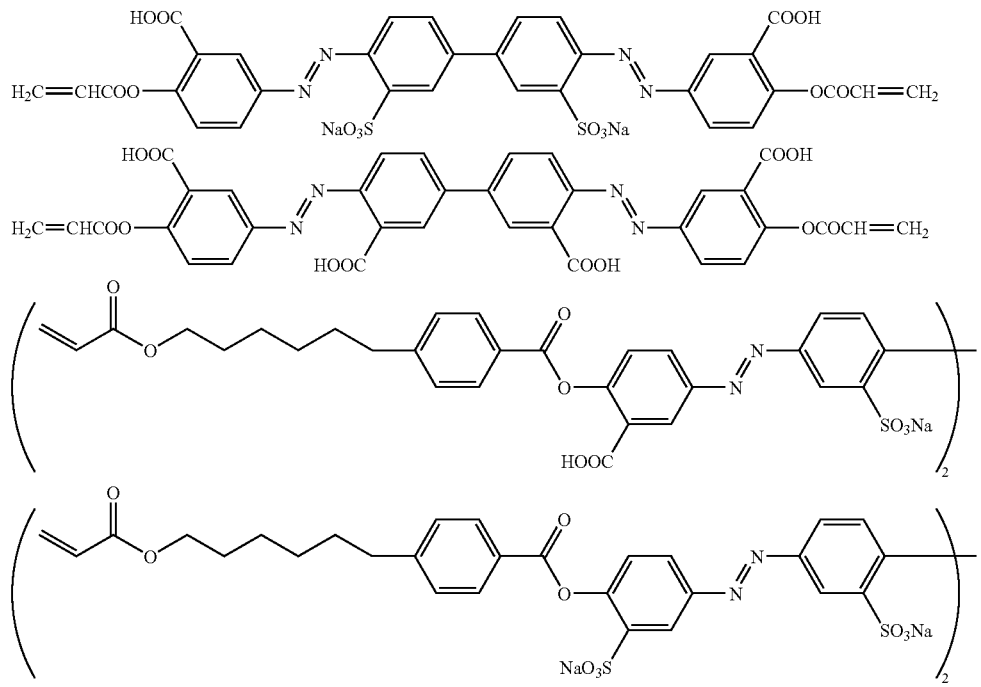

In the present embodiment, the cis-trans isomerization-reactive skeleton or substituent can be variously selected from the above-mentioned photo isomerization-reactive compounds in accordance with required properties. One kind of the photo isomerization-reactive compound may be used alone or a combination of two or more kinds can be used.

Additives, besides the above-mentioned photo isomerization-reactive compound, may be contained as the photo isomerization type material used in the embodiment as long as the photoaligning of the photo alignment layer is not hindered. In the case of using a polymerizable monomer as the photo isomerization-reactive compound, examples of the additives include a polymerization initiator and a polymerization inhibitor.

It is advisable to select the polymerization initiator or the polymerization inhibitor appropriately from generally-known compounds in accordance with the kind of the photo isomerization-reactive compound and then use the selected one. The added amount of the polymerization initiator or the polymerization inhibitor is preferably from 0.001% by weight to 20% by weight, more preferably from 0.1% by weight to 5% by weight of the photo isomerization-reactive compound.

The photo alignment process in the case of using such a photo isomerization type material can be formed by the same method as in the case of using the photoreaction type material. In this case, the content of the photo isomerization-reactive compound in the coating solution is preferably in a range of 0.05% by weight to 10% by weight, and it is more preferably in a range of 0.2% by weight to 5% by weight. In the case of using the photo isomerization type, the photo alignment process can also be conducted by radiating oblique non-polarized ultraviolet rays.

The direction of the radiation of the light is not especially limited if the direction makes it possible to generate the photo-excited reaction, and is preferably in the range of 10° to 45° oblique to the substrate face, more preferably in the range of 30° to 45° oblique thereto, and most preferably 45° oblique thereto since the alignment state of the ferroelectric liquid crystal can be made good.

Furthermore, in the case of using a polymerizable monomer as described above as the photo isomerization-reactive compound, the photo alignment process is conducted, and then the monomer is heated, thereby polymerizing the monomer. In this way, the anisotropy given to the photo alignment layer can be made stable.

B. Manufacturing Method of the Liquid Crystal Display

Next, the manufacturing method of the liquid crystal display of the present invention will be explained. The manufacturing method of the liquid crystal display of the present invention is the manufacturing method of the liquid crystal display of the present invention explained in the item of "A. Liquid crystal display", comprising a coating film forming step of forming a coating film by coating a columnar alignment layer forming coating solution on the substrate, a drying step of drying the coating film, and a fixing process stop of executing a hydrophobic process of the dried coating film so as to be fixed in the formation of the columnar alignment layer.

According to the present invention, since the coating film is formed by coating the columnar alignment layer forming coating solution containing the plate-like molecule on the substrate, and fixing the coating film by the hydrophobic process after drying the coating film in the formation of the columnar alignment layer, the columnar alignment layer capable of controlling the alignment of the ferroelectric liquid crystal by a simple method without the need of the alignment process such as the rubbing alignment process and the photo alignment process can be formed.

Moreover, according to the present invention, since the fixing process step is provided, the hydrophilic group of the plate-like molecule formed on the substrate can be processed to be hydrophobic so that the column structure comprising the plate-like molecule can be fixed, the liquid crystal display having the excellent alignment stability of the ferroelectric liquid crystal can be obtained.

According to the present invention, as described in the item of "A. Liquid crystal display", the columnar alignment layer may either be a single layer with the column structure formed or one having a resin layer with a concave part or a convex part having a predetermined width formed in a pattern on the surface and the column structure formed along the concave part of the resin layer. At the time, in order to form the columnar alignment layer as a single layer with the column structure formed, the columnar alignment layer forming costing solution is coated on the substrate. On the other hand, in order to form the columnar alignment layer comprising the resin layer and the column structure, first the resin layer is formed on the substrate, and then the columnar alignment layer forming costing solution is coated onto the resin layer. In either case, by coating the columnar alignment layer forming coating solution, the column structure can be aligned utilizing the self organization of the plate-like molecule without the need of the alignment process such as the rubbing alignment process and the photo alignment process, the columnar alignment layer can be formed by the roll to roll process so that the production efficiency can be improved.

The manufacturing method of the liquid crystal display of the present invention will be explained hereinafter. As mentioned above, formation of the columnar alignment layer is characteristic of the method of the present invention, and since the method for forming the other constituent members is same as that explained in the item of "A. Liquid crystal display", explanation is omitted here. Hereinafter, the method for forming the columnar alignment layer used in the present invention will be explained.

As mentioned above, the method for forming the columnar alignment layer used in the present invention comprises a coating film forming step of forming a coating film by coating a columnar alignment layer forming coating solution on the substrate, a drying step of drying the coating film, and a fixing process step of executing a hydrophobic process of the dried coating film so as to be fixed. Hereafter, each stop will be explained.

(1) Coating Film Forming Step

First, the coating film forming step will be explained. In this step, the coating film is formed by coating the columnar alignment layer forming coating solution on the substrate. Hereafter, the columnar alignment layer forming coating solution used in this step and the coating method thereof will be explained.

(Columnar Alignment Layer Forming Coating Solution)

First, the columnar alignment layer forming coating solution used in this step will be explained. The columnar alignment layer forming coating solution used in this step is prepared by dispersing or dissolving the plate-like molecule in a solvent such as water. The solvent for dispersing or dissolving the plate-like molecule is not particularly limited as long as it is inert to the plate-like molecule, and it is selected optionally according to the substituent introduced to the plate-like molecule. In the case a hydrophilic group such as a sulfonic acid group is introduced, water is used as the solvent. On the other hand, in the case a hydrophobic group such as a long chain alkyl group is introduced, an organic solvent is used.

Moreover, the columnar alignment layer forming coating solution may contain a liquid crystal material in addition to the plate-like molecule. For example, even in the case the plate-like molecule can hardly be aligned, by aligning the liquid crystal material, the plate-like molecule can be aligned along the alignment direction of the liquid crystal material. As the liquid crystal material, a liquid crystal material commonly used for forming an alignment layer can be used. Moreover, the liquid crystal composition of the liquid crystal material and the plate-like molecule may show either the lyotropic liquid crystal phase or the thermotropic liquid crystal phase. In general, one showing the thermotropic liquid crystal is used.

The above-mentioned columnar alignment layer forming coating solution may as needed contain various kinds of the additives such as a surfactant including a polyethylene glycol.

Among the above-mentioned, it is preferable in this embodiment that the columnar alignment layer forming coating solution is water based. By using a water based columnar alignment layer forming coating solution, handling can be facilitated.

Since the plate-like molecule used for the columnar alignment layer forming coating solution are same as those explained in the column of "A. Liquid crystal display", explanation is omitted here.

(Method for Coating the Columnar Alignment Layer Forming Coating Solution)

Next, the coating method for coating the columnar alignment layer forming coating solution onto the substrate will be explained. In this step, the coating method for the columnar alignment layer forming coating solution is not particularly limited as long as the normal direction of the plate-like molecule can be aligned in a certain direction. For example, various coating methods such as Mayer bar coating, gravure coating, die coating, dip coating and spray coating, the screen printing method, the ink jet method, or the like can be used. The coating method can be determined optionally depending on whether the column structure is formed on a plane as the substrate explained in the item of "A. Liquid crystal display" or on the rugged surface as the resin layer having a concave part or a convex part formed in a pattern on the surface.

For example, in the case the column structure is formed on the substrate, it is preferable to select the coating method capable of applying the shearing stress out of the methods. By using the coating method capable of applying the shearing stress, the column structure formation can be facilitated. As the coating methods capable of applying the shearing stress, for example, Mayer bar coating, slot die coating, slide coating, or the like can be presented. In particular, it is preferable to use slot die coating.

On the other hand, in the case the column structure is formed on the resin layer with the concave part or the convex part formed in a pattern on the surface, it is preferable to use a coating method without applying the shearing stress so as to form the column structure along the rugged shape on the resin layer. In this case, as the coating method, the ink jet method, spray coating, dip coating and the flexo printing method can be used preferably. In particular, the ink jet method is preferable.

(2) Drying Step

Next, the drying step of drying the coating film by evaporating the solvent contained in the coating film formed as mentioned above will be explained. In the present invention, by providing the drying step, the fixing process step to be described later can be carried out smoothly.

The drying method used in this step is not particularly limited as long as the column structure formed on the coating film is not destroyed or the concave part or convex part pattern of the resin layer is not deformed so that the methods commonly used for drying the solvent, such as heat drying, room temperature drying, freeze drying, far infrared ray drying, or the like can be used.

(3) Fixing Process Step

Next, in the present invention, the fixing process step of having the hydrophobic process of the hydrophilic group of the plate-like molecule so as to have the plate-like molecule insoluble or hardly soluble to water and fixing the column structure comprising the plate-like molecule is carried out. Since such a fixing process step is provided, the water resistance can be provided to the formed columnar alignment layer. The liquid crystal display accordingly obtained does not have the column structure disturbance by the moisture in the air, or the like so that the alignment stability of the ferroelectric liquid crystal can be excellent.

The hydrophobic process solution used in this step is not particularly limited as long as it can process the hydrophilic group of the plate-like molecule to be hydrophobic, inert to the plate-like molecule and it does not destroy the column structure comprising the plate-like molecule. Although it differs depending on the hydrophilic group of the plate-like molecule to be used, it is preferably one capable of forming cross-linking among the adjacent plate-like molecules.

As the hydrophobic process solution, specifically, an aqueous solution of an alkaline earth metal salt such as a barium salt, a calcium salt and a magnesium salt can be used, and a barium chloride aqueous solution, a calcium chloride aqueous solution, a magnesium chloride aqueous solution, or the like can be presented. For example, in the case the plate-like molecule has a $SO_3NH_4$ group, by coupling the sulfonic acid ion of the $SO_3NH_4$ group and the barium ion, the adjacent plate-like molecules can be cross-linked so as to fix the column structure.

Moreover, the hydrophobic process method is not particularly limited as long as it is a method capable of processing the hydrophilic substituent so as to be hydrophobic, and a method of coating the hydrophobic process solution after drying the columnar alignment layer forming coating solution, a method of soaking into the hydrophobic process solution, or the like can be presented. By washing and drying after coating or soaking in the hydrophobic process solution, the columnar alignment layer can be provided.

On the other hand, in the case the plate-like molecule has a long chain alkyl group, by introducing a polymerizable group in the core portion of the plate-like molecule or a part of the alkyl side chain and polymerizing the polymerizable group, the plate-like molecule can be cross-linked linearly or like a mesh so as to fix the alignment state.

Furthermore, in the case the columnar alignment layer forming coating solution contains a liquid crystal material, the alignment state of the plate-like molecule can also be fixed by polymerizing the liquid crystal material. In this case, the liquid crystal material needs to have a polymerizable group.

According to the present invention, the columnar alignment layer can be formed only by coating the columnar alignment layer forming coating solution and carrying out a simple post process. Moreover, since the column structure is fixed, the liquid crystal display having the excellent alignment stability of the ferroelectric liquid crystal can be manufactured.

The present invention is not limited to the embodiments. The above-mentioned embodiments are merely examples, and any one having the substantially same configuration as the technological idea disclosed in the claims of the present invention and the same effects is included in the technological scope of the present invention.

EXAMPLES

Hereinafter, the present invention will be explained in further details with reference to the examples.

Example 1

(Production of the First Alignment Substrate)

After coating with a slot die coater, a 12% aqueous solution of the plate-like molecule represented by the below-mentioned chemical formula (A) onto the ITO film of a glass substrate having an ITO electrode, washed well, and drying, it was soaked in a 15% barium chloride aqueous solution for about 1 second. By further washing and drying again, a first alignment substrate having a 0.1 μm thickness columnar alignment layer was obtained.

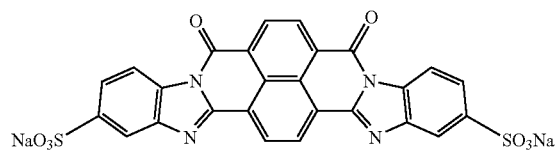

(A)

(Production of the Second Alignment Substrate)

In the same manner as the method except that the compound represented by the below-mentioned chemical formula (B) was used as the plate-like molecule, a second alignment substrate having a 0.2 μm thickness columnar alignment layer was obtained.

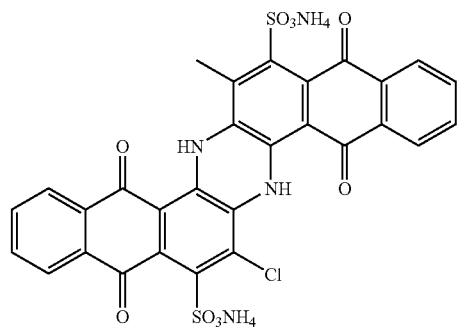

(B)

(Formation of the Liquid Crystal Layer)

With 1.5 μm diameter bead spacer scattered on the columnar alignment layer of the first alignment substrate and a sealing material coated on the columnar alignment layer of the second alignment substrate using a seal dispenser, the first alignment substrate and the second alignment substrate were attached in a state disposed such that the normal direction of the plate-like molecule of the columnar alignment layer of the first alignment substrate and the normal direction of the plate-like molecule of the columnar alignment layer of the second alignment substrate are parallel and the columnar alignment layers face with each other. By carrying out the thermal pressing at 150° C. for about 1 hour, a test cell was produced. By injecting a ferroelectric liquid crystal (produced by AZ Electronic Materials, R2301) into the test cell by the about 100° C. temperature condition and cooling down the same gradually, a mono domain even alignment was obtained.

Example 2

(Production of the First Alignment Layer)

After coating with a slot die coater, a 12% aqueous solution of the plate-like molecule represented by the above-mentioned chemical formula (A) onto the ITO film of a glass substrate having an ITO electrode, washed well, and drying, it was soaked in a 15% barium chloride aqueous solution for about 1 second. By further washing and drying again, a 0.1 µm thickness columnar alignment layer was obtained.

A solution produced by dissolving in a cyclopentanone the reactive liquid crystal represented by the below-mentioned chemical formula (C) to have the 2% by weight concentration was spin coated onto the columnar alignment layer by 4,000 rpm for 30 seconds. After drying at 55° C. for 3 minutes, a 1,000 mJ/cm² non polarized ultraviolet ray was irradiated for forming a reactive liquid crystal layer so as to obtain a first alignment substrate.

condition and cooling down the same gradually, a mono domain even alignment was obtained.

Example 3

(Production of the First Alignment Substrate)

In the same manner as in the example 1, a first alignment substrate having a 0.1 µm thickness columnar alignment layer was obtained.

(Production of the Second Alignment Substrate)

A solution produced by dissolving in a cyclopentanone the photo dimerization-reactive compound represented by the below-mentioned chemical formula (D) to have the 2% by weight concentration was spin coated onto the ITO film of a glass substrate having an ITO electrode, washed well, by 4,000 rpm for 30 seconds. After drying at 180° C. for 10 minutes, a 100 mJ/cm² polarized ultraviolet ray was irradiated for forming a photo alignment layer so as to obtain a first alignment substrate.

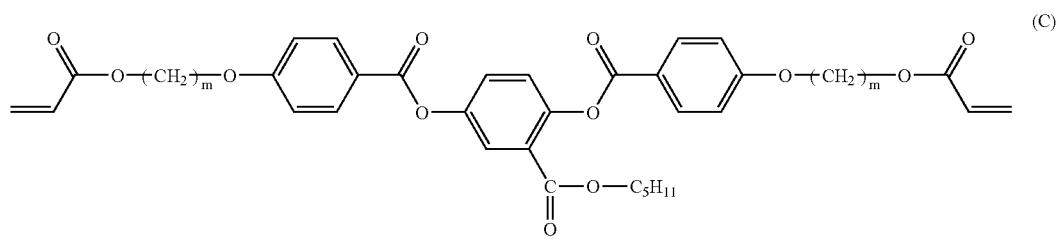

(C)

(Production of the Second Alignment Substrate)

In the same manner as in the example 1, a second alignment substrate having a 0.2 µm thickness columnar alignment layer was obtained.

(Formation of the Liquid Crystal Layer)

With 1.5 µm diameter bead spacer scattered on the reactive liquid crystal layer of the first alignment substrate and a sealing material coated on the columnar alignment layer of the second alignment substrate using a seal dispenser, the first alignment substrate and the second alignment substrate were attached in a state disposed such that the normal direction of the plate-like molecule of the columnar alignment layer of the first alignment substrate and the normal direction of the plate-like molecule of the columnar alignment layer of the second alignment substrate are orthogonal and the reactive liquid crystal layer and the columnar alignment layer face with each other. By carrying out the thermal pressing at 150° C. for about 1 hour, a test cell was produced. By injecting a ferroelectric liquid crystal (produced by AZ Electronic Materials, R2301) into the test cell by the about 100° C. temperature

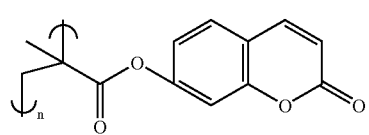

(D)

(Formation of the Liquid Crystal Layer)

With 1.5 µm diameter bead spacer scattered on the columnar alignment layer of the first alignment substrate and a sealing material coated on the photo alignment layer of the second alignment substrate using a seal dispenser, the first alignment substrate and the second alignment substrate were attached in a state disposed such that the normal direction of the plate-like molecule of the columnar alignment layer of the first alignment substrate and the alignment direction of the photo alignment layer of the second alignment substrate are parallel and the columnar alignment layer and the photo alignment layer face with each other. By carrying out the thermal pressing at 150° C. for about 1 hour, a test cell was produced. By injecting a ferroelectric liquid crystal (produced by AZ Electronic Materials, R2301) into the test cell by the about 100° C. temperature condition and cooling down the same gradually, a mono domain even alignment was obtained.

Example 4

(Production of the First Alignment Substrate)

An ultraviolet ray curable acrylate resin composition of the below-mentioned composition was spin coated onto a glass substrate having an ITO electrode, washed well. With a concave part forming substrate having the ruggedness formed by the electron beam drawing method placed thereon, a 100 kg/cm$^2$ load was applied for 1 minute. After directing an ultraviolet ray by 100 mJ/cm$^2$ in this state and removing the concave part forming substrate, an ultraviolet ray was directed by 3,000 mJ/cm$^2$ so as to form a concave part pattern in a stripe form having a 0.2 μm width, a 0.4 μm pitch and a 0.2 μm depth. By applying the plasma process thereto, the hydrophilic process was carried out on the surface.

| (Composition of the ultraviolet ray curable acrylate resin) | |
|---|---|
| GohselacUV-7500B (produced by Nippon Synthetic Chemical Industry Co., Ltd.) | 40 parts by weight |
| 1,6-hexane diol acrylate (produced by NIPPON KAYAKU CO., LTD) | 35 parts by weight |
| Pentaerythritol acrylate (produced by TOAGOSEI Co., Ltd.) | 21 parts by weight |
| 1-hydroxy cyclohexyl phenyl ketone (produced by Chiba Speciality Chemicals) | 2 parts by weight |
| Benzo phenone (produced by NIPPON KAYAKU CO., LTD) | 2 parts by weight |

After coating a 12% aqueous solution of the plate-like molecule represented by the chemical formula (A) on the concave part pattern using the ink jet and drying, it was soaked in a 15% barium chloride aqueous solution for about 1 second. By further washing and drying again, a columnar alignment layer having a 0.1 μm thickness in the portion comprising the column structure was formed so as to obtain a first alignment substrate.

(Production of the Second Alignment Substrate)

In the same manner as in the example 1, a second alignment substrate having a 0.2 μm thickness columnar alignment layer was obtained.

(Formation of the Liquid Crystal Layer)

With 1.5 μm diameter bead spacer scattered on the columnar alignment layer of the first alignment substrate and a sealing material coated on the columnar alignment layer of the second alignment substrate using a seal dispenser, the first alignment substrate and the second alignment substrate were attached in a state disposed such that the normal direction of the plate-like molecule of the columnar alignment layer of the first alignment substrate and the normal direction of the plate-like molecule of the columnar alignment layer of the second alignment substrate are parallel and the columnar alignment layers face with each other. By carrying out the thermal pressing at 150° C. for about 1 hour, a test cell was produced. By injecting a ferroelectric liquid crystal (produced by AZ Electronic Materials, R2301) into the test cell by the about 100° C. temperature condition and cooling down the same gradually, a mono domain even alignment was obtained.

Example 5

With the same conditions as in the example 1, a test cell was produced. A liquid crystal prepared by mixing 5% by mass of a polymerizable monomer (produced by DAINIPPON INK AND CHEMICALS, Inc. UCL-001) to a ferroelectric liquid crystal (produced by AZ Electronic Materials, R2301) was injected into the test cell by the about 100° C. temperature condition and cooled down the same gradually. Thereafter, by the exposure with a non polarized ultraviolet ray by about 1,000 mJ/cm$^2$, the polymerizable monomer was polymerized. In the liquid crystal display obtained accordingly, a mono domain even alignment was obtained.

What is claimed is:

1. A liquid crystal display comprising a first alignment substrate having a first substrate, a first electrode layer formed on the first substrate and a first alignment layer formed on the first electrode layer, and a second alignment substrate having a second substrate, a second electrode layer formed on the second substrate, and a second alignment layer formed on the second electrode layer, disposed such that the first alignment layer and the second alignment layer face with each other, with a ferroelectric liquid crystal interposed between the first alignment layer and the second alignment layer, wherein at least one of the first alignment layer and the second alignment layer is a columnar alignment layer having a column structure with a plate-like molecule laminated with a normal direction of the plate-like molecule aligned in a certain direction.

2. The liquid crystal display according to claim 1, wherein the first alignment layer and the second alignment layer are the columnar alignment layer, wherein the normal direction of the plate-like molecule of the first alignment layer and the normal direction of the plate-like molecule of the second alignment layer are disposed substantially parallel, and a constituent material of the first alignment layer and a constituent material of the second alignment layer have a composition different with each other.

3. The liquid crystal display according to claim 1, wherein the first alignment layer and the second alignment layer are the columnar alignment layer, the normal direction of the plate-like molecule of the first alignment layer and the normal direction of the plate-like molecule of the second alignment layer are disposed substantially perpendicularly, and a reactive liquid crystal layer produced by fixing a reactive liquid crystal including a polymerizable liquid crystal material and showing a nematic phase on a counter surface of the first alignment layer or the second alignment layer is provided.

4. The liquid crystal display according to claim 1, wherein the first alignment layer is the columnar alignment layer, and the second alignment layer is a photo alignment layer.

5. The liquid crystal display according to claim 4, wherein a constituent material for the photo alignment layer is a photoreactive material for providing an anisotropy to the photo alignment layer by generating a photoreaction, or a photo isomerizable material for providing the anisotropy to the photo alignment layer by generating a photo isomerization reaction.

6. The liquid crystal display according to claim 1, wherein the columnar alignment layer comprises a resin layer with a concave part or a convex part having a predetermined width formed on a surface in a pattern, and the column structure formed along the concave part of the resin layer.

7. The liquid crystal display according to claim 1, wherein the plate-like molecule shows a lyotropic liquid crystal phase in an aqueous solution.

8. The liquid crystal display according to claim 1, wherein the ferroelectric liquid crystal shows a mono-stability driving characteristic.

9. The liquid crystal display according to claim 1, wherein the ferroelectric liquid crystal shows a phase transition sequence without a smectic A phase in a temperature cooling process.

10. The liquid crystal display according to claim 1, comprising a thin film transistor in the first electrode layer or the second electrode layer, and it is driven by an active matrix drive.

11. The liquid crystal display according to claim 1, driven by a field sequential color system.

12. A manufacturing method of the liquid crystal display according to claim 1, comprising a coating film forming step of forming a coating film by coating a columnar alignment layer forming coating solution on the substrate, a drying step of drying the coating film, and a fixing process step of executing a hydrophobic process of the coating film dried so as to be fixed in a formation of the columnar alignment layer.

* * * * *